(12) United States Patent
Kim

(10) Patent No.: US 11,668,812 B2
(45) Date of Patent: Jun. 6, 2023

(54) OBJECT DETECTION DEVICE AND VEHICLE CONTROL SYSTEM INCLUDING THE SAME

(71) Applicant: SAMSUNG ELECTRONICS CO., LTD., Suwon-si (KR)

(72) Inventor: Dohyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 17/007,348

(22) Filed: Aug. 31, 2020

(65) Prior Publication Data
US 2021/0223362 A1 Jul. 22, 2021

(30) Foreign Application Priority Data

Jan. 20, 2020 (KR) ........................ 10-2020-0007258

(51) Int. Cl.
*G01S 7/41* (2006.01)
*G01S 13/42* (2006.01)
(Continued)

(52) U.S. Cl.
CPC ............ *G01S 13/865* (2013.01); *G01S 7/412* (2013.01); *G01S 13/42* (2013.01); *G01S 13/867* (2013.01);
(Continued)

(58) Field of Classification Search
CPC ........ G01S 7/412; G01S 13/42; G01S 13/865; G01S 13/867; G01S 13/931;
(Continued)

(56) References Cited

U.S. PATENT DOCUMENTS

| 4,573,053 A | 2/1986 | Mori et al. |
| 10,412,701 B2 | 9/2019 | Wu et al. |

(Continued)

FOREIGN PATENT DOCUMENTS

| KR | 19870000138 | 2/1987 |
| KR | 211270 A | 7/1998 |

*Primary Examiner* — Bernarr E Gregory
*Assistant Examiner* — Yonghong Li
(74) *Attorney, Agent, or Firm* — Volentine, Whitt & Francos, PLLC

(57) ABSTRACT

An object detection device includes a first sensor, a second sensor, a calculation range selector and an estimator. The first sensor outputs a radio frequency (RF) signal, receives a reflected RF signal reflected from an object, and obtains a first measurement value for the object based on a received reflected RF signal. The second sensor obtains a second measurement value for the object by sensing a physical characteristic from the object. The physical characteristic sensed by the second sensor is different from a characteristic of the object measured as the first measurement value obtained by the first sensor. The calculation range selector sets a first reference range based on the second measurement value. The first reference range represents a range of execution of a first calculation for detecting a position of the object using a first algorithm. The estimator performs the first calculation only on the first reference range using the first measurement value, and generates a first result value as a result of performing the first calculation. The first result value represents the position of the object.

20 Claims, 17 Drawing Sheets

(51) Int. Cl.
*G01S 13/86* (2006.01)
*G01S 13/931* (2020.01)
*G06V 20/58* (2022.01)
*G06F 18/25* (2023.01)
*G06V 10/22* (2022.01)
*G06V 20/56* (2022.01)

(52) U.S. Cl.
CPC ............ *G01S 13/931* (2013.01); *G06F 18/25* (2023.01); *G06V 10/22* (2022.01); *G06V 20/56* (2022.01); *G06V 20/58* (2022.01)

(58) Field of Classification Search
CPC ............... G01S 7/4086; G01S 13/4454; G01S 2013/0263; G01S 7/4021; G01S 17/931; G01S 13/003; G01S 13/878; G01S 2013/9318; G01S 2013/93185; G01S 2013/9319; G01S 13/86; G01S 2013/0245; G01S 7/4026; G01S 2013/0319; G06K 9/6288; G06V 20/58; G06V 20/56; G06V 10/22; G08G 1/16; G08G 1/01; G08G 1/04; B60R 21/0134; B60W 40/02; B60W 2420/42; B60W 2420/52

See application file for complete search history.

(56) References Cited

U.S. PATENT DOCUMENTS

| | | |
|---|---|---|
| 2014/0334265 A1* | 11/2014 | Yoo ...................... G01S 3/8006 367/118 |
| 2016/0299216 A1 | 10/2016 | Matsumoto |
| 2018/0143297 A1 | 5/2018 | Jansen |
| 2018/0341000 A1 | 11/2018 | Cohen et al. |
| 2018/0375219 A1 | 12/2018 | Kirino et al. |
| 2019/0222330 A1 | 7/2019 | Shan |
| 2019/0372750 A1* | 12/2019 | Wang ................. H04W 56/001 |

* cited by examiner $$PV = \begin{bmatrix} pd_1 \\ pd_2 \\ \vdots \\ pd_m \end{bmatrix}$$

FIG. 4B $$SV1 = \begin{bmatrix} s1_{11} & s1_{12} & \cdots & s1_{1m} \\ s1_{21} & s1_{22} & \cdots & s1_{2m} \\ \vdots & \vdots & & \vdots \\ s1_{m1} & s1_{m2} & \cdots & s1_{mm} \end{bmatrix} \overset{AMV}{}$$

$$\vdots$$

$$SVn = \begin{bmatrix} sn_{11} & sn_{12} & \cdots & sn_{1m} \\ sn_{21} & sn_{22} & \cdots & sn_{2m} \\ \vdots & \vdots & & \vdots \\ sn_{m1} & sn_{m2} & \cdots & sn_{mm} \end{bmatrix}$$

OBJECT DETECTION DEVICE AND VEHICLE CONTROL SYSTEM INCLUDING THE SAME

CROSS-REFERENCE TO RELATED APPLICATION

This U.S. nonprovisional patent application claims priority under 35 USC § 119 to Korean Patent Application No. 10-2020-0007258, filed on Jan. 20, 2020 in the Korean Intellectual Property Office (KIPO), the disclosure of which is herein incorporated by reference in its entirety.

BACKGROUND

1. Technical Field

Example embodiments of the present disclosure relate generally to semiconductor integrated circuits. More particularly, example embodiments of the present disclosure relate to object detection devices that detect objects around vehicles, and vehicle control systems which include the object detection devices.

2. Description of the Related Art

Recently, owing to the convergence of information communication technologies and the car industry, cars have rapidly become increasingly smarter. Accordingly, cars have evolved from simple mechanisms controlled entirely by a driver to smart cars. Smart cars may be controlled by a driver with the assistance of advanced driver assistance systems (ADAS) and can sometimes be controlled entirely by autonomous driving systems. ADAS and autonomous driving systems are particularly highlighted as core technologies for smart cars.

For ADAS and autonomous driving systems, various technologies such as a technology for recognizing the driving environment (e.g., car lanes, ambient vehicles, pedestrians, etc.), a technology for determining the driving condition, a control technology such as steering, acceleration/deceleration, etc., are required. In addition, for such various technologies, it is necessary to precisely and efficiently recognize and/or detect objects around vehicles.

SUMMARY

At least one example embodiment of the present disclosure provides an object detection device capable of precisely, rapidly and efficiently recognizing and/or detecting objects around vehicles.

At least one example embodiment of the present disclosure provides a vehicle control system including the object detection device.

According to example embodiments, an object detection device includes a first sensor, a second sensor, a calculation range selector and an estimator. The first sensor outputs a radio frequency (RF) signal, receives a reflected RF signal reflected from an object, and obtains a first measurement value for the object based on a received RF signal. The second sensor obtains a second measurement value for the object by sensing a physical characteristic from the object. The physical characteristic sensed by the second sensor is different from a characteristic of the object measured as the first measurement value obtained by the first sensor. The calculation range selector sets a first reference range based on the second measurement value. The first reference range represents a range of execution of a first calculation for detecting a position of the object using a first algorithm. The estimator performs the first calculation only on the first reference range using the first measurement value, and generates a first result value as a result of performing the first calculation. The first result value represents the position of the object.

According to example embodiments, a vehicle control system includes an object detection device and a controller. The object detection device detects an object around a vehicle and generates a first result value representing a position of the object. The controller controls the vehicle based on the first result value. The object detection device includes a first sensor, a second sensor, a calculation range selector and an estimator. The first sensor outputs a radio frequency (RF) signal, receives a reflected RF signal reflected from the object, and obtains a first measurement value for the object based on a received reflected RF signal. The second sensor obtains a second measurement value for the object by sensing a physical characteristic from the object. The physical characteristic sensed by the second sensor is different from a characteristic of the object measured as the first measurement value obtained by the first sensor. The calculation range selector sets a first reference range based on the second measurement value. The first reference range represents a range of execution of a first calculation for detecting the position of the object using a first algorithm. The estimator performs the first calculation only on the first reference range using the first measurement value, and generates the first result value as a result of performing the first calculation.

According to example embodiments, an object detection device includes a first sensor, a second sensor, a third sensor, a calculation range selector and an estimator. The first sensor outputs a radio frequency (RF) signal, receives a reflected RF signal reflected from an object, divides a received reflected RF signal into an in-phase component and a quadrature-phase component, calculates a phase of the received RF signal based on the in-phase component and the quadrature-phase component, and generates a phase vector based on a calculated phase. The second sensor obtains image information for the object based on reflected light reflected from the object. The third sensor outputs a laser pulse, receives a reflected laser pulse reflected from the object, and obtains measurement information for the object based on a received reflected laser pulse. The calculation range selector sets a first reference range based on at least one of the image information obtained by the second sensor and the measurement information obtained by the third sensor. The first reference range is a portion of an entire range of execution available for selection of a multiple signal classification (MUSIC) algorithm. The estimator performs a calculation based on the MUSIC algorithm only on the first reference range using the phase vector, and estimates an azimuth of the object representing a position of the object. The estimator selects steering vectors corresponding to the first reference range from an array manifold (AM) vector including a plurality of steering vectors that are pre-measured, calculates covariance matrices based on selected steering vectors and the phase vector, obtains a MUSIC spectrum value by normalizing the covariance matrices, by calculating determinants of normalized covariance matrices, and by reciprocalizing the determinants, extracts a peak value from the MUSIC spectrum value, and estimates the azimuth of the object based on the peak value of the vectors in the spatial spectrum.

In the object detection device and the vehicle control system according to example embodiments, the first calculation based on the first algorithm for detecting the position of the object may be performed using the first measurement value obtained from the first sensor. In addition, a portion of the entire range of execution available for selection for the first calculation may be set as the reference range using the second measurement value obtained from the second sensor, and the first calculation may be performed only on the reference range corresponding to a portion of the entire range of execution available for selection for the first calculation. The second sensor may be a sensor of a different type from the first sensor, and may sense the physical characteristic different from a characteristic of the object measured as the first measurement value obtained by the first sensor. Accordingly, the amount of calculation may be reduced, the object may be rapidly and efficiently detected, and the performance and accuracy of detecting the object may be maintained without degradation.

BRIEF DESCRIPTION OF THE DRAWINGS

Illustrative, non-limiting example embodiments will be more clearly understood from the following detailed description taken in conjunction with the accompanying drawings.

FIG. 2 and FIG. 3 are diagrams for describing a configuration and an operation of a first sensor included in an object detection device according to example embodiments.

FIG. 4A and FIG. 4B are diagrams for describing an operation of an estimator included in an object detection device according to example embodiments.

DETAILED DESCRIPTION OF THE EMBODIMENTS

Figure 1:
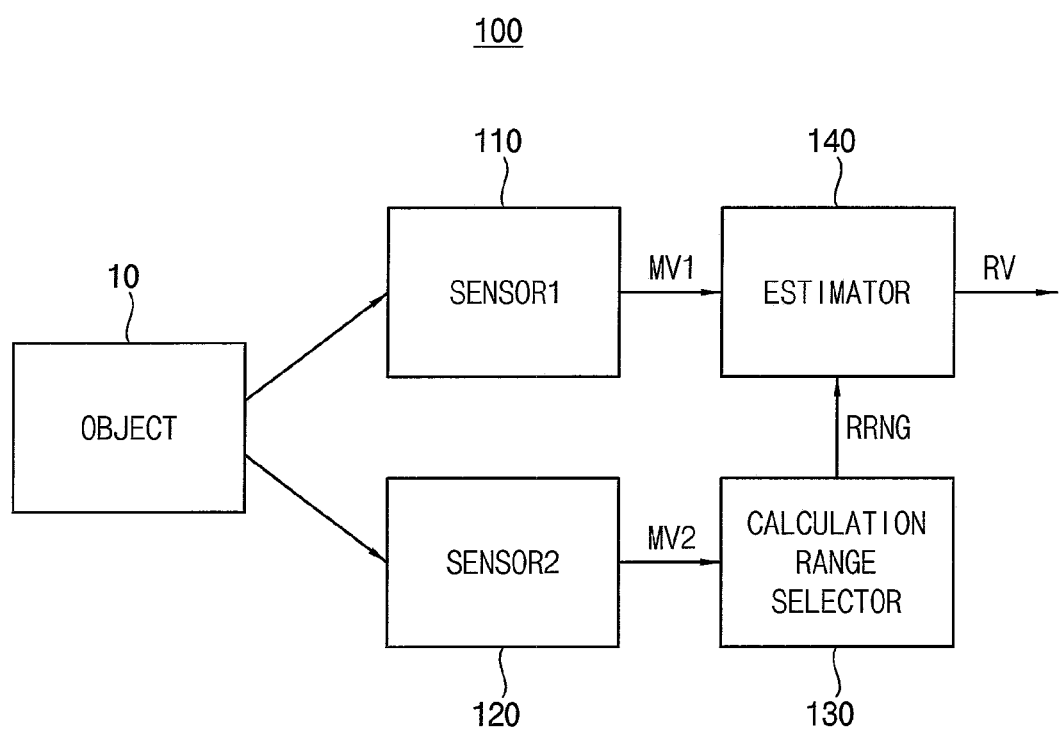
FIG. 1 is a block diagram illustrating an object detection device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating an object detection device according to example embodiments.

Referring to FIG. 1, an object detection device 100 includes a first sensor 110, a second sensor 120, a calculation range selector 130 and an estimator 140.

The first sensor 110 obtains or acquires a first measurement value MV1 for an object 10. The second sensor 120 obtains or acquires a second measurement value MV2 for the object 10. The first sensor 110 and the second sensor 120 may be sensors of different types. For example, the first sensor 110 and the second sensor 120 may obtain the first measurement value MV1 and the second measurement value MV2, respectively, by sensing different physical characteristics (or properties) from the object 10. In other words, the physical characteristic sensed by the second sensor 120 may be different from a characteristic of the object 10 measured by or otherwise reflected in the first measurement value obtained by the first sensor 110. That is, the physical characteristic sensed by the second sensor 120 is not a physical characteristic or property sensed by the first sensor 110. The physical characteristic sensed by the second sensor 120 is obtained by the second sensor 120 on a basis that is independent of and different than the basis by which the first sensor 110 obtains a physical characteristic or property of the object 10.

In some example embodiments, the first sensor 110 may be a radio detection and ranging (RADAR) sensor. For example, the first sensor 110 may output or transmit a radio frequency (RF) signal and may receive a reflected RF signal reflected from the object 10. The first sensor 110 may obtain the first measurement value MV1 for the object 10 based on a received reflected RF signal. Detailed configurations of the first sensor 110 and the first measurement value MV1 obtained from (or by) the first sensor 110 will be described with reference to FIG. 2 and FIG. 3.

In some example embodiments, the second sensor 120 may be an image sensor. For example, the second sensor 120 may include a charge-coupled device (CCD) image sensor, a complementary metal-oxide semiconductor (CMOS) image sensor, or the like. The second sensor 120 may obtain image information for the object 10 based on reflected light reflected from the object 10. The image information obtained by (or from) the second sensor 120 may correspond to the second measurement value MV2 for the object 10. When the second sensor 120 is an image sensor, the physical characteristic measured as the second measurement value MV2 may be characteristics from image information, such as a size, shape, reflectivity, color or other characteristic of the object 10 that may be represented as image information.

In other example embodiments, the second sensor 120 may be a light detection and ranging (LIDAR) sensor. For example, the second sensor 120 may output or transmit a laser pulse and may receive a reflected laser pulse reflected from the object 10. The second sensor 120 may obtain the second measurement value MV2 for the object 10 based on a received reflected laser pulse.

In still other example embodiments, the second sensor 120 may include both of the image sensor and the LIDAR sensor. As will be described with reference to FIG. 10 and FIG. 14, and object detection device 100 according to example embodiments may further include two or more sensors of different types other than the first sensor 110.

The calculation range selector 130 sets a reference range RRNG based on the second measurement value MV2. The reference range RRNG represents a range of execution of a first calculation (or arithmetic operation) for detecting a position (or location) of the object 10 using a first algorithm. Detailed operation of setting the reference range RRNG by the calculation range selector 130 will be described with reference to FIG. 6 and FIG. 7. An example of the reference range RRNG is a subset of steering vectors SV1, . . . , SVn of an array manifold vector AMV that includes a plurality of the steering vectors SV1, . . . , SVn. Steering vectors SV1, . . . , SVn and the array manifold vector AMV are described below with respect to, for example, FIGS. 4A and 4B. The range of execution may refer to a range of degrees in a spatial spectrum, and may be fewer than all degrees in the spatial spectrum. Thus, a range of execution as described herein may refer to a subset of information that is subject to calculations from a larger set of information that is potentially subject to calculations. The range of execution may refer to vectors corresponding to a limited subset of vectors within an arc in the 360 degrees in a circle.

The estimator 140 performs the first calculation based on the first algorithm (e.g., the first algorithm based calculation) only on the reference range RRNG using the first measurement value MV1, and generates a result value RV as a result of performing the first calculation. For example, the result value RV may include a first result value representing the position of the object 10. The result value RV may further include a second result value representing a distance to the object 10 and a velocity of the object 10. Detailed operations of performing the first calculation and generating the result value RV by the estimator 140 will be described with reference to FIG. 8.

In some example embodiments, the first algorithm may be a multiple signal classification (MUSIC) algorithm. The MUSIC algorithm is a representative algorithm for estimating an incident direction, that is, a direction of arrival (DOA) of a signal. In the MUSIC algorithm, a spatial spectrum may be obtained by using the property that a signal subspace and a noise subspace are orthogonal to each other. The DOA is correlated with and estimated from a peak value of the vectors in the spatial spectrum. Such two subspaces may be obtained by the eigen decomposition of covariance matrix. When the first algorithm is the MUSIC algorithm, the first result value may represent an azimuth (or azimuth angle) of the object 10.

In some example embodiments, at least a part of the calculation range selector 130 and/or the estimator 140 may be implemented as hardware. For example, at least a part of the calculation range selector 130 and/or the estimator 140 may be included in a computer-based electronic system. In other example embodiments, at least a part of the calculation range selector 130 and/or the estimator 140 may be implemented as instruction codes or program routines (e.g., a software program). For example, the instruction codes or the program routines may be executed by a computer-based electronic system, and may be stored in any storage device located inside or outside the computer-based electronic system.

In the object detection device 100 according to example embodiments, the first calculation based on the first algorithm for detecting the position of the object 10 may be performed using the first measurement value MV1 obtained from the first sensor 110. In addition, a portion of the entire range of execution available for selection for the first calculation may be set as the reference range RRNG using the second measurement value MV2 obtained from the second sensor 120. The entire range of execution available for selection for the first calculation may refer to a potential range that may be subject to calculation, whereas the reference range RRNG may be a subset of the potential range such as a limited subset of vectors within an arc in the 360 degrees in a circle. The reference range RRNG may therefore include information such as the limited subset of vectors that are actually calculated, out of the entire range of execution that is potentially available for calculation, and this is explained in the context of, for example, FIG. 4A and FIG. 4B below. The first calculation may be performed only on the reference range RRNG corresponding to a portion of the entire range of execution available for selection for the first calculation. The second sensor 120 may be a sensor of a different type from the first sensor 110, and may sense the physical characteristic different from a characteristic of the object 10 measured by or otherwise reflected in the first measurement value MV1 obtained by the first sensor 110. Accordingly, the amount of calculation (or computation) may be reduced, the object 10 may be rapidly and efficiently detected, and the performance and accuracy of detecting the object 10 may be maintained without degradation.

Hereinafter, an operation of the object detection device according to example embodiments will be described based on the MUSIC algorithm. However, example embodiments are not limited thereto. For example, the object detection device according to example embodiments may estimate the azimuth of the object 10 based on Bartlett beamforming algorithm, Capon algorithm, or the like. Alternatively, the object detection device according to example embodiments may estimate the position of the object 10 based on at least one of various algorithms for estimating various parameters associated with or related to the position of the object 10.

Figure 2:
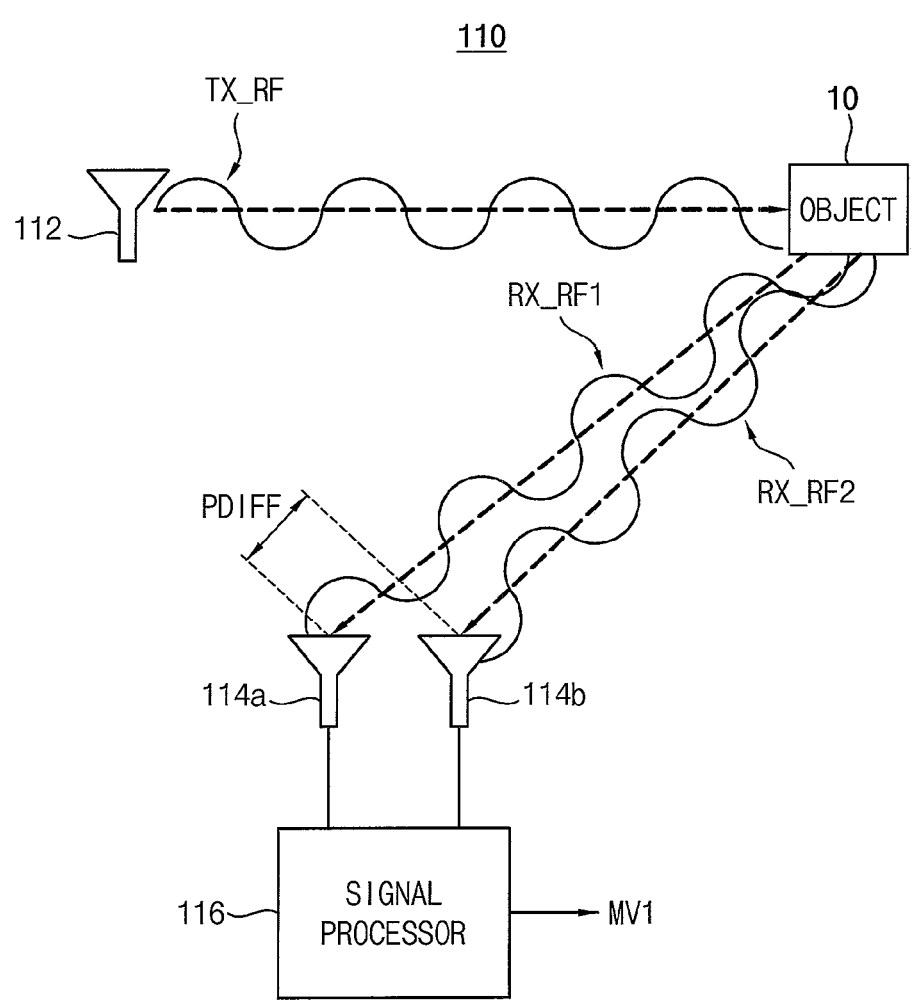
Figures 3, 4A:
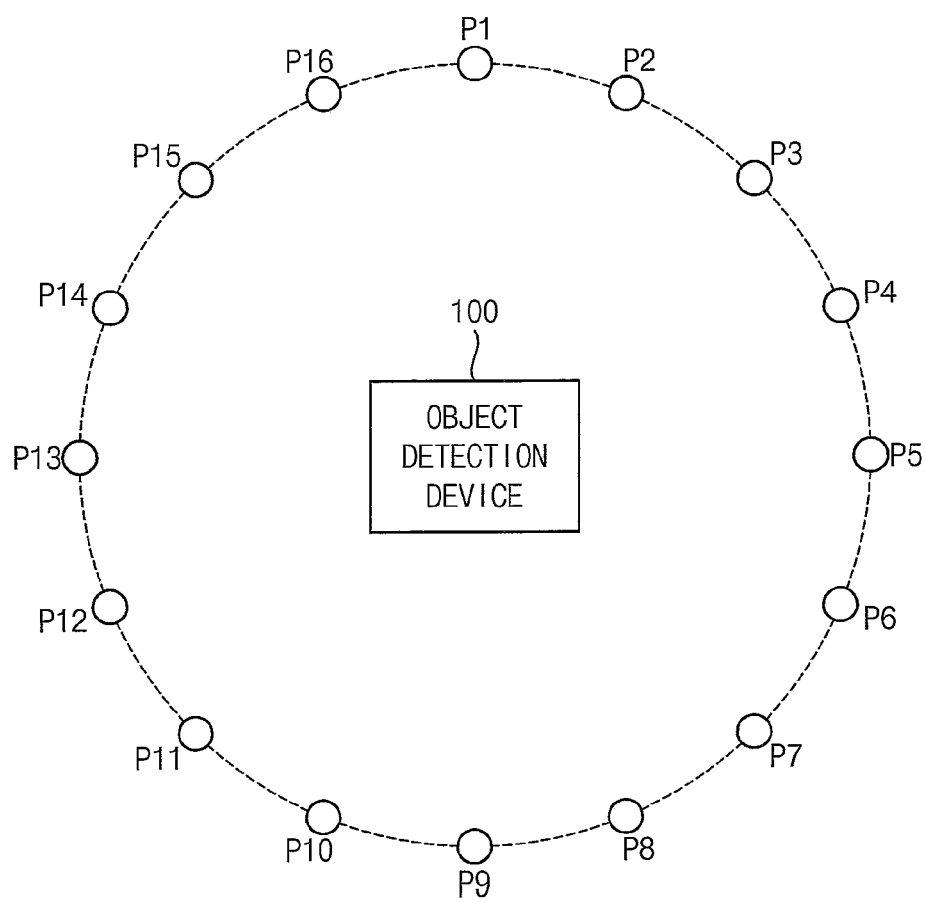

FIG. 2 and FIG. 3 are diagrams for describing a configuration and an operation of a first sensor included in an object detection device according to example embodiments.

Referring to FIG. 2, the first sensor 110 may be a RADAR sensor, and may include a transmission antenna 112, a plurality of reception antennas 114a and 114b and a signal processor 116.

The transmission antenna 112 may output or transmit an RF signal TX_RF. For example, a frequency of the RF signal TX_RF may be variously implemented, such as about 24 GHz or 77 GHz. For example, when the frequency of the RF signal TX_RF is about 77 GHz, the first sensor 110 may have a relatively high performance, but may be relatively expensive and have a relatively complicated configuration. When the frequency of the RF signal TX_RF is about 24 GHz, the first sensor 110 may be relatively inexpensive, but may have a relatively low performance. The RF signal TX_RF output from the transmission antenna 112 may reach the object 10 and then may be reflected by the object 10.

The plurality of reception antennas 114a and 114b may receive a reflected RF signal reflected from the object 10. Since positions of the reception antennas 114a and 114b are different from each other and distances between the object 10 and the reception antennas 114a and 114b are different from each other, received RF signals RX_RF1 and RX_RF2 obtained by the reception antennas 114a and 114b may have a phase difference PDIFF. Although only two reception antennas 114a and 114b are illustrated in FIG. 2 for convenience of illustration, example embodiments are not limited thereto. The first sensor 110 may include m reception antennas where m is a natural number greater than or equal to two.

The signal processor 116 may divide each of the received RF signals RX_RF1 and RX_RF2 obtained from the plurality of reception antennas 114a and 114b into an in-phase component and a quadrature-phase component. The signal processor 116 may calculate a phase of each of the received RF signals RX_RF1 and RX_RF2 based on the in-phase component and the quadrature-phase component. The signal processor 116 may generate the first measurement value MV1 based on calculated phases.

Referring to FIG. 3, when the first sensor 110 includes m reception antennas, the first measurement value MV1 obtained from the first sensor 110 may correspond to a phase vector PV that includes m components $pd_1, pd_2, \ldots, pd_m$ and is denoted by an m*1 matrix.

In some example embodiments, a first reception antenna (e.g., the foremost reception antenna) among the m reception antennas included in the first sensor 110 may be set as a reference reception antenna. In this case, among the m components $pd_1, pd_2, \ldots, pd_m$ included in the phase vector PV, a k-th component may represent a phase difference between an RF signal received by the first reception antenna and an RF signal received by a k-th reception antenna among the m reception antennas, where k is a natural number greater than or equal to one and less than or equal to m. For example, the first component $pd_1$ among the m components $pd_1, pd_2, \ldots, pd_m$ may represent a phase difference that is always zero insofar as it is calculated as a difference between the same RF signal, e.g., between the RF signal received by the first reception antenna and the RF signal received by the first reception antenna. The second component $pd_2$ among the m components $pd_1, pd_2, \ldots, pd_m$ may represent a phase difference between the RF signal received by the first reception antenna and an RF signal received by a second reception antenna. The m-th component $pd_m$ among the m components $pd_1, pd_2, \ldots, pd_m$ may represent a phase difference between the RF signal received by the first reception antenna and an RF signal received by an m-th reception antenna.

The estimator 140 in FIG. 1 may generate the first result value (e.g., the azimuth of the object 10) representing the position of the object 10 using the phase vector PV illustrated in FIG. 3.

Although not illustrated in FIG. 2 and FIG. 3, when the second sensor 120 is a LIDAR sensor, the LIDAR sensor may have a configuration similar to that of the RADAR sensor illustrated in FIG. 2. For example, the LIDAR sensor may include a transmission antenna, a plurality of reception antennas and a signal processor. The transmission antenna may output or transmit a laser pulse. The plurality of reception antennas may receive a reflected laser pulse reflected from the object 10 based on the transmitted laser pulse. The signal processor may obtain a measurement value based on a received reflected laser pulse.

FIG. 4A and FIG. 4B are diagrams for describing an operation of an estimator included in an object detection device according to example embodiments.

Referring to FIG. 4A and FIG. 4B, the estimator 140 included in the object detection device 100 may include an array manifold (AM) vector AMV that includes a plurality of steering vectors SV1, ..., SVn. The plurality of steering vectors SV1, ..., SVn and the AM vector AMV may be pre-measured (or previously measured) using the first sensor 110 and may be stored in the estimator 140.

For example, as illustrated in FIG. 4A, the object detection device 100 may be disposed in a default environment such as an empty space in which no particular object exists. A virtual circle may be set with respect to the object detection device 100. A plurality of measurement positions (or locations) P1, P2, P3, P4, P5, P6, P7, P8, P9, P10, P11, P12, P13, P14, P15 and P16 may be set at regular intervals along a circumference of the virtual circle. RF signals transmitted by or otherwise output from, or reflected by the plurality of measurement positions P1 to P16 may be received by the object detection device 100. Thus, the plurality of steering vectors SV1, ..., SVn may be obtained based on the received RF signals. One steering vector may be obtained based on one RF signal, and thus the number of the plurality of measurement positions P1 to P16 may be substantially equal to the number of the plurality of steering vectors SV1, ..., SVn. The plurality of steering vectors SV1, ..., SVn and the AM vector AMV may be measured, obtained and stored in advance as a comparison target and/or a default value for performing object detection and estimation operations. For example, the plurality of steering vectors SV1, ..., SVn and the AM vector AMV may be pre-set, such as in a calibration mode of the object detection device 100.

Since the plurality of measurement positions P1 to P16 are set at regular intervals along the circumference of the virtual circle, all angles between two adjacent measurement positions may be substantially the same as each other. For example, when sixteen measurement positions P1 to P16 are set as illustrated in FIG. 4A, all angles between two adjacent measurement positions (e.g., an angle between two measurement positions P1 and P2) may be about 22.5 degrees. However, example embodiments are not limited thereto, and the number of measurement positions and the angle between two adjacent measurement positions may vary according to example embodiments. As the number of measurement positions (e.g., the number of steering vectors) increases, the accuracy of the estimation operation may increase, however, the amount of calculation may increase thereby increasing the time required for the estimation operation.

When the first sensor 110 includes the m reception antennas, each of the plurality of steering vectors SV1, ..., SVn may be denoted by an m*m matrix as illustrated in FIG. 4B. For example, the steering vector SV1 obtained at the first measurement position may be denoted by an m*m matrix including components $s1_{11}, s1_{12}, \ldots, s1_{1m}, s1_{21}, s1_{22}, \ldots, s1_{2m}, \ldots, s1_{m1}, s1_{m2}, \ldots, s1_{mm}$. The steering vector SVn obtained at the last measurement position may be denoted by an m*m matrix including components $sn_{11}, sn_{12}, \ldots, sn_{1m}, sn_{21}, sn_{22}, \ldots, sn_{2m}, \ldots, sn_{m1}, sn_{m2}, \ldots, sn_{mm}$.

In some example embodiments, the estimator 140 may include a memory that stores the AM vector AMV including the plurality of steering vectors SV1, ..., SVn. For example, the memory may include any nonvolatile memories, e.g., an electrically erasable programmable read-only memory (EEPROM), a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc., and/or any volatile memories, e.g., a dynamic random access memory (DRAM), a static random access memory (SRAM), etc.

The estimator 140 in FIG. 1 may generate the first result value (e.g., the azimuth of the object 10) representing the position of the object 10 using the plurality of steering vectors SV1, ..., SVn illustrated in FIG. 4B.

Figure 5:
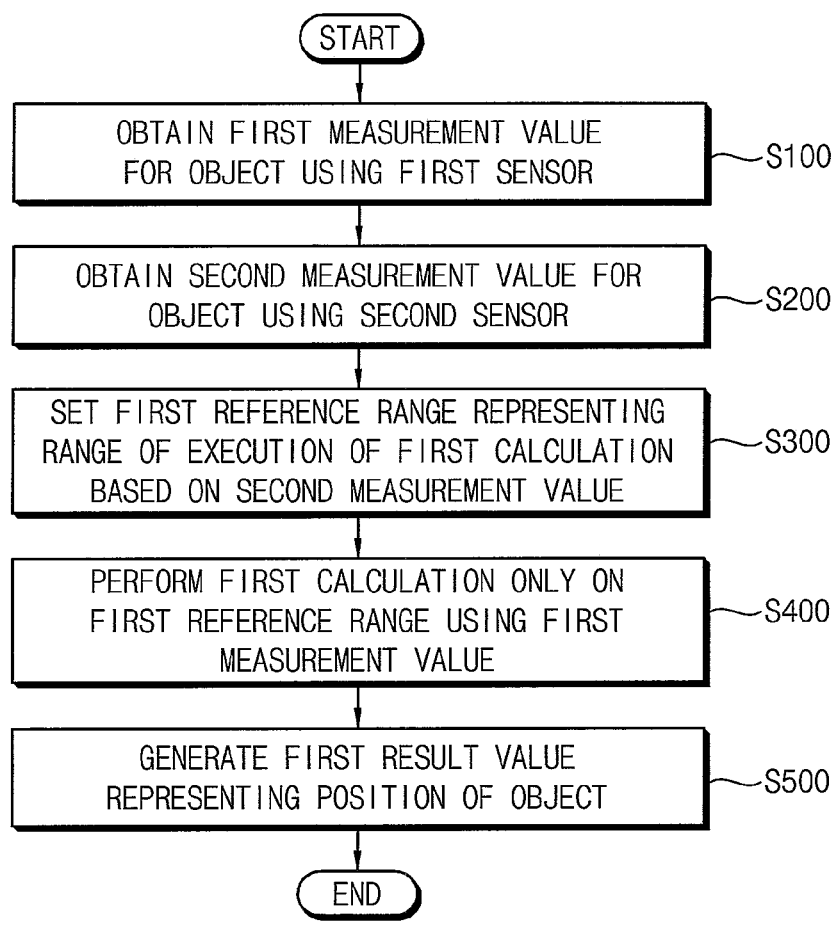
FIG. 5 is a flowchart illustrating an object detection method according to example embodiments.

FIG. 5 is a flowchart illustrating an object detection method according to example embodiments.

Referring to FIG. 1 and FIG. 5, in an object detection method according to example embodiments, the first measurement value MV1 for the object 10 is obtained using the first sensor 110 (step S100). For example, the first sensor 110 may be a RADAR sensor, may receive the reflected RF signal reflected from the object 10, and may obtain the phase vector (e.g., the phase vector PV of FIG. 3) corresponding to the first measurement value MV1 based on the received RF signal.

The second measurement value MV2 for the object 10 is obtained using the second sensor 120 (step S200). The second sensor 120 may be a sensor of a different type from the first sensor 110, and may sense the physical characteristic of the object 10 different from a characteristic of the object 10 measured by or reflected in the first measurement value MV1 obtained by the first sensor 110. For example, the second sensor 120 may be an image sensor, and may obtain the image information corresponding to the second measurement value MV2 based on the reflected light reflected from the object 10.

A first reference range is set based on the second measurement value MV2 (step S300). The first reference range represents the actual range of execution of the first calculation based on the first algorithm, and the actual range of execution may be a subset of the entire range of execution that is potentially available for the first calculation. Step S300 may be performed by the calculation range selector 130.

The first calculation based on the first algorithm is performed only on the first reference range using the first measurement value MV1 (step S400), and the first result value is generated as a result of performing the first calculation (step S500). The first result value represents the position of the object 10. For example, the first algorithm may be a MUSIC algorithm, and the first result value may be the azimuth of the object 10. Steps S400 and S500 may be performed by the estimator 140.

In some example embodiments, when generating the first result value in step S500, steps S100, S200, S300 and S400 may be repeatedly performed. A plurality of result values obtained from repeating steps S100, S200, S300 and S400 may be statistically processed, and then the first result value may be finally determined.

Figure 6:
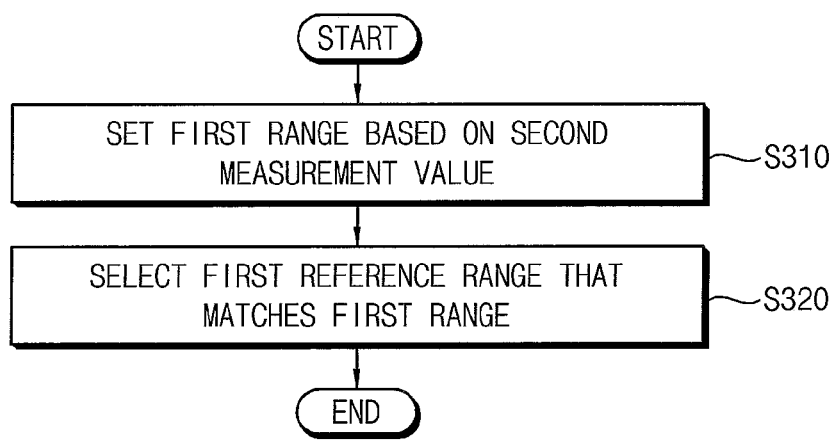
FIG. 6 and FIG. 7 are flowcharts illustrating examples of setting a first reference range in FIG. 5.
Figure 7:
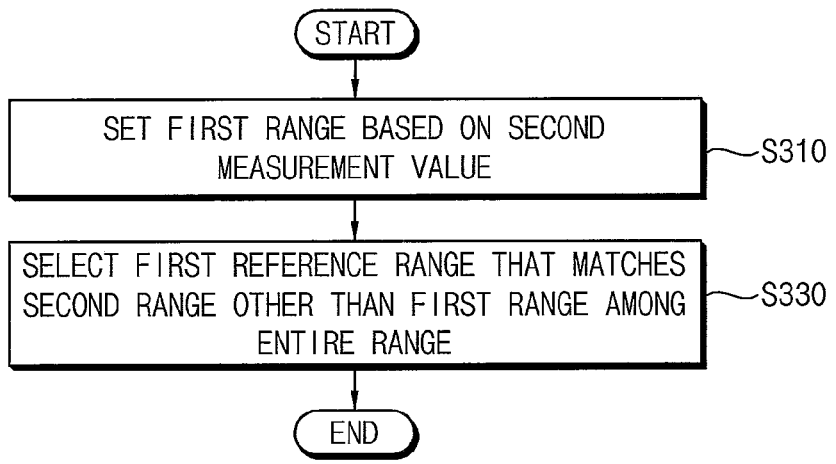

FIG. 6 and FIG. 7 are flowcharts illustrating examples of setting a first reference range in FIG. 5.

Referring to FIG. 1, FIG. 5 and FIG. 6, when setting the first reference range (step S300), a first range may be set based on the second measurement value MV2 obtained from the second sensor 120 (step S310). The first reference range that matches the first range may be selected (step S320).

For example, when a reliability of the first range is higher than a reference value such as when a reliability of the second sensor 120 is relatively high, the first reference range that is identical to the first range may be selected. As another example, when an additional check operation is required for the first range such as when it is necessary to double-check the first range, the first reference range that is identical to the first range may be selected. Accordingly, the first calculation in step S400 of FIG. 5 may be performed only within a range determined by the second sensor 120.

Referring to FIG. 1, FIG. 5 and FIG. 7, when setting the first reference range (step S300), a first range may be set based on the second measurement value MV2 obtained from the second sensor 120 (step S310). The first reference range that matches a second range other than the first range among the entire range available for selection may be selected (step S330).

For example, when the reliability of the first range is lower than the reference value such as when the reliability of the second sensor 120 is relatively low, the first reference range that is identical to the second range other than the first range may be selected. As another example, when a check operation is required for the second range other than the first range such as when it is necessary to check a blind spot other than the first range, the first reference range that is identical to the second range other than the first range may be selected. Accordingly, the first calculation in step S400 of FIG. 5 may be performed only outside of the range determined by the second sensor 120. For example, the first calculation in step S400 of FIG. 5 may be performed only outside of a coverage of the second sensor 120.

Although operations and specific scenarios for selecting the first reference range are described with reference to FIG. 6 and FIG. 7, example embodiments are not limited thereto. Operations and specific scenarios for selecting the first reference range may vary according to example embodiments.

Figure 8:
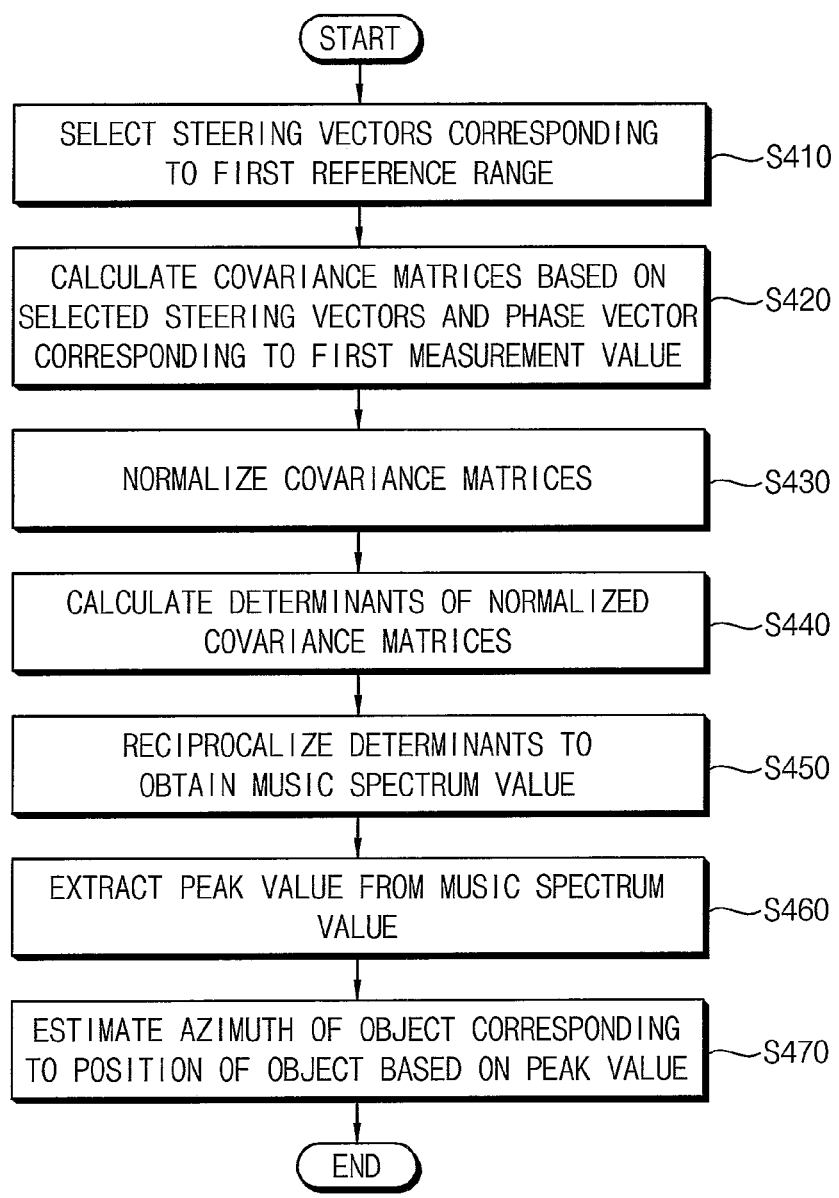
FIG. 8 is a flowchart illustrating an example of performing a first calculation only on a first reference range in FIG. 5.
Figure 9A:
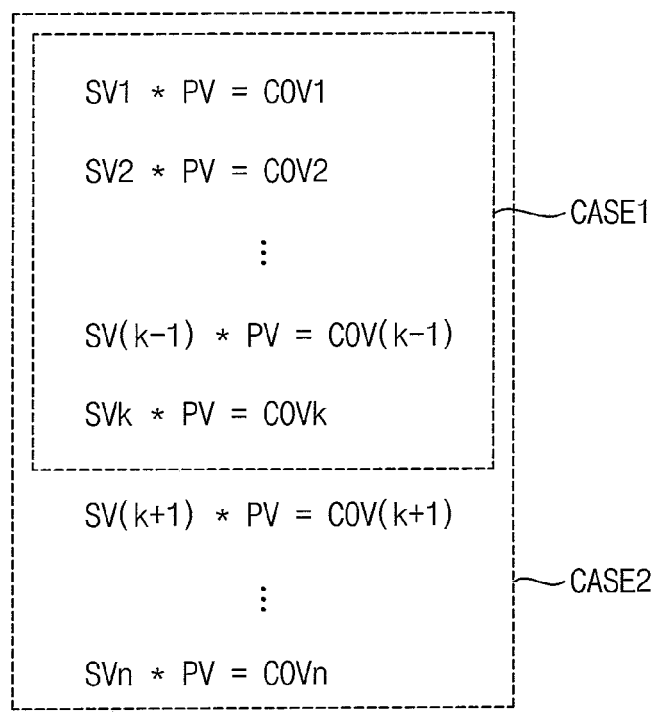
FIG. 9A and FIG. 9B are diagrams for describing an operation of FIG. 8.
Figure 9B:
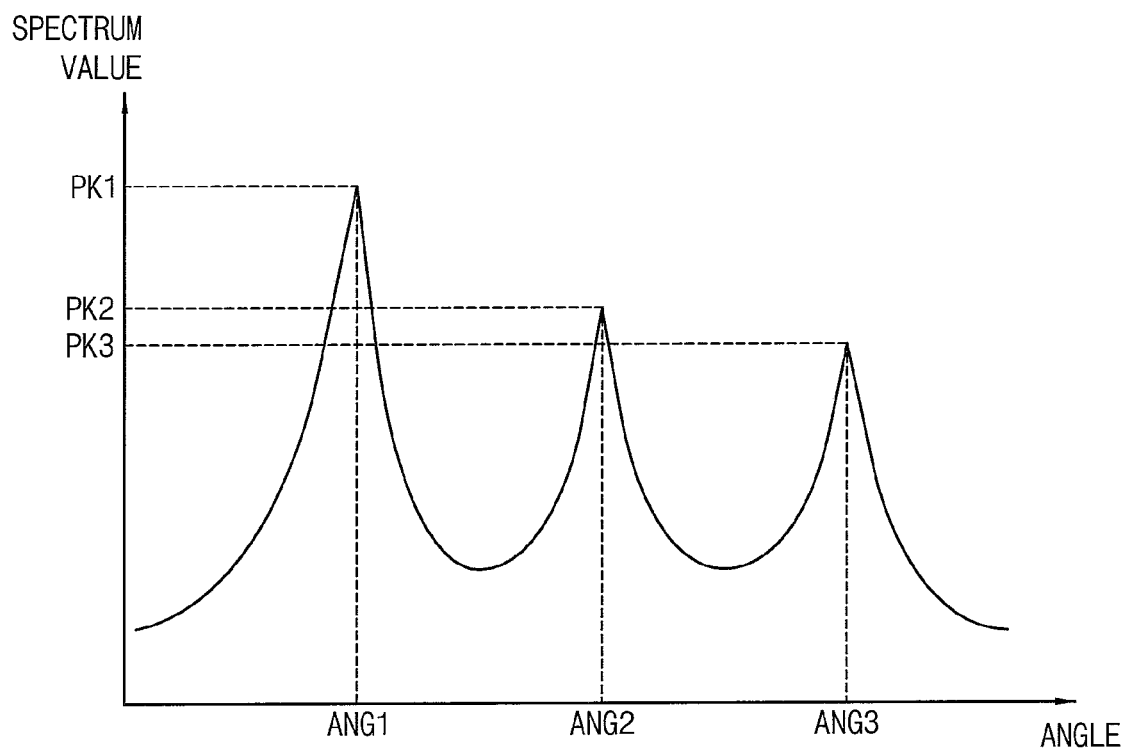

FIG. 8 is a flowchart illustrating an example of performing a first calculation only on a first reference range in FIG. 5. FIG. 9A and FIG. 9B are diagrams for describing an operation of FIG. 8.

Referring to FIG. 1, FIG. 5, FIG. 8, FIG. 9A and FIG. 9B, step S400 may be performed based on the MUSIC algorithm.

As described above, the MUSIC algorithm may be an algorithm for estimating a DOA of a signal by using the property that a signal subspace and a noise subspace are orthogonal to each other, and such two subspaces may be obtained by the eigen decomposition of covariance matrix. For example, when the first sensor 110 includes the m reception antennas and when P signals are incident on the m reception antennas, where P is a natural number greater than or equal to two, the received signal may be defined by Equation 1.

$$X(t) = \sum_{p=1}^{P} A * s_l(t) + n(t) = AS + n \qquad \text{[Equation 1]}$$

In Equation 1, "A" represents a set of steering vectors $a(\varphi)$. For example, "A" may have the form of Equation 2.

$$A = [\, a(\phi_1) \quad a(\phi_2) \quad \ldots \quad a(\phi_P) \,] \qquad \text{[Equation 2]}$$

In Equation 2, "$a(\varphi)$" may be defined as $a(\phi) = e^{-j2\pi d \sin \phi / \lambda}$, where "d" represents a distance between corresponding reception antennas. The covariance matrix for obtaining the signal subspace and the noise subspace may be obtained based on Equation 3.

$$R = E[XX^H] = AR_s A^H + \delta^2 I \qquad \text{[Equation 3]}$$

Equation 3 represents the covariance matrix of the signal. In the MUSIC algorithm, the direction of the signal may be estimated through the noise subspace of the signal. A noise subspace $E_N$ of the signal may be obtained by the eigen decomposition of "R." For example, the DOA of the signal may be obtained in the MUSIC algorithm based on Equation 4.

$$a(\phi)^H E_N E_N^H a(\phi) = 0 \quad \text{[Equation 4]}$$

In the MUSIC algorithm, "φ" that satisfies Equation 4 may be estimated as the DOA of the signal. A spatial spectrum may be obtained based on Equation 5.

$$P(\phi) = \frac{1}{a(\phi)^H E_N E_N^H a(\phi)} \quad \text{[Equation 5]}$$

As can be seen from Equation 5, the spatial spectrum may have a peak value at the vector "φ" that satisfies Equation 4 as much as possible. Thus, the vector "φ" having the peak value in the spatial spectrum may be estimated as the DOA of the signal.

When performing the first calculation only on the first reference range using the first measurement value (step S400), steering vectors corresponding to the first reference range may be selected from an AM vector including a plurality of steering vectors that are pre-measured (step S410). Covariance matrices may be calculated based on selected steering vectors and a phase vector corresponding to the first measurement value (step S420).

For example, as illustrated in FIG. 9A, among all of a plurality of steering vectors SV1, SV2, . . . , SV(k−1), SVk, SV(k+1), . . . , SVn that are measured and stored in advance, steering vectors SV1, SV2, . . . , SV(k−1), SVk included in the first reference range that is set in step S300 may be selected. A covariance matrix COV1 may be obtained by multiplying the selected steering vector SV1 and the phase vector PV. A covariance matrix COV2 may be obtained by multiplying the selected steering vector SV2 and the phase vector PV. A covariance matrix COV(k−1) may be obtained by multiplying the selected steering vector SV(k−1) and the phase vector PV. A covariance matrix COVk may be obtained by multiplying the selected steering vector SVk and the phase vector PV. As described with reference to FIG. 3 and FIG. 4B, when the phase vector PV is denoted by an m*1 matrix and each of the steering vectors SV1 to SVn is denoted by an m*m matrix, each of the covariance matrices COV1, COV2, . . . , COV (k−1), COVk may be denoted by an m*1 matrix.

When the covariance matrices COV1, COV2, . . . , COV (k−1), COVk are obtained by multiplying the selected steering vectors SV1, SV2, . . . , SV(k−1), SVk and the phase vector PV according to example embodiments, the amount of calculation may be reduced and the speed of calculation may be increased, as compared to a conventional art CASE2 in which covariance matrices COV1, COV2, . . . , COV(k−1), COVk, COV(k+1), . . . , COVn are obtained by multiplying all of the plurality of steering vectors SV1, SV2, . . . , SV(k−1), SVk, SV(k+1), . . . , SVn and the phase vector PV.

In other words, when the calculation based on the MUSIC algorithm is performed only on a partial range (or a portion of the entire range available for selection) according to example embodiments, the speed of calculation may be increased by narrowing the scope of the calculation. For example, when information in which the object is located at about 10, 20 and 70 degrees is obtained from the second sensor 120, the calculation may be performed using only steering vectors corresponding to about 0 to 80 degrees. ADAS and autonomous driving systems may encounter numerous objects at any time, such that calculations based on the MUSIC algorithm may be performed in parallel for multiple different objects detected by the ADAS and autonomous driving systems. As described herein, the calculations for the object detection can be reduced by narrowing the scope of calculation for one or multiple objects, thereby increasing the speed of calculation.

After that, the covariance matrices may be normalized (step S430). The MUSIC algorithm may be an algorithm that considers only the phase difference between the received RF signals. Accordingly, the covariance matrices corresponding to the received RF signals may be normalized to have the same size.

After that, determinants of the normalized covariance matrices may be calculated (step S440). The determinants may be reciprocalized. Accordingly, a MUSIC spectrum value may be obtained (step S450). By taking the reciprocal or inverse of the determinants in step S450, an item with the high correlation may be reduced and a peak value may be formed within the MUSIC spectrum value.

After that, a peak value may be extracted from the MUSIC spectrum value (step S460). The azimuth of the object corresponding to the position of the object may be estimated based on the peak value (step S470).

For example, the MUSIC spectrum value may be derived as illustrated in FIG. 9B. The MUSIC spectrum value of FIG. 9B may include peak values PK1, PK2 and PK3 and azimuths ANG1, ANG2 and ANG3 corresponding thereto. Among the azimuths ANG1, ANG2 and ANG3 corresponding to the peak values PK1, PK2 and PK3, an azimuth included in the first reference range may be estimated as the azimuth of the object.

In other words, when the calculation based on the MUSIC algorithm is performed only on a partial range according to example embodiments, relatively accurate and reliable detection may be performed and the ambiguity of detection can be solved even if a large number of peak values exist in the generated spectrum. For example, when the information in which the object is located at about 10, 20 and 70 degrees is obtained from the second sensor 120, the MUSIC spectrum may be obtained by performing the calculation using only steering vectors corresponding to about 0 to 80 degrees. In addition, when the azimuths corresponding to peak values in the MUSIC spectrum are about 18 degrees and about 43 degrees, the azimuth of the object may be estimated to one of the two peak values such as either about 18 degrees or about 43 degrees, depending on the r.

As a result, when the calculation based on the MUSIC algorithm is performed only on a partial range according to example embodiments, a disadvantage of the MUSIC algorithm in which several azimuths are obtained when the used bandwidth is relatively narrow or the number of reception antennas is relatively small may be efficiently overcome.

Figure 10:
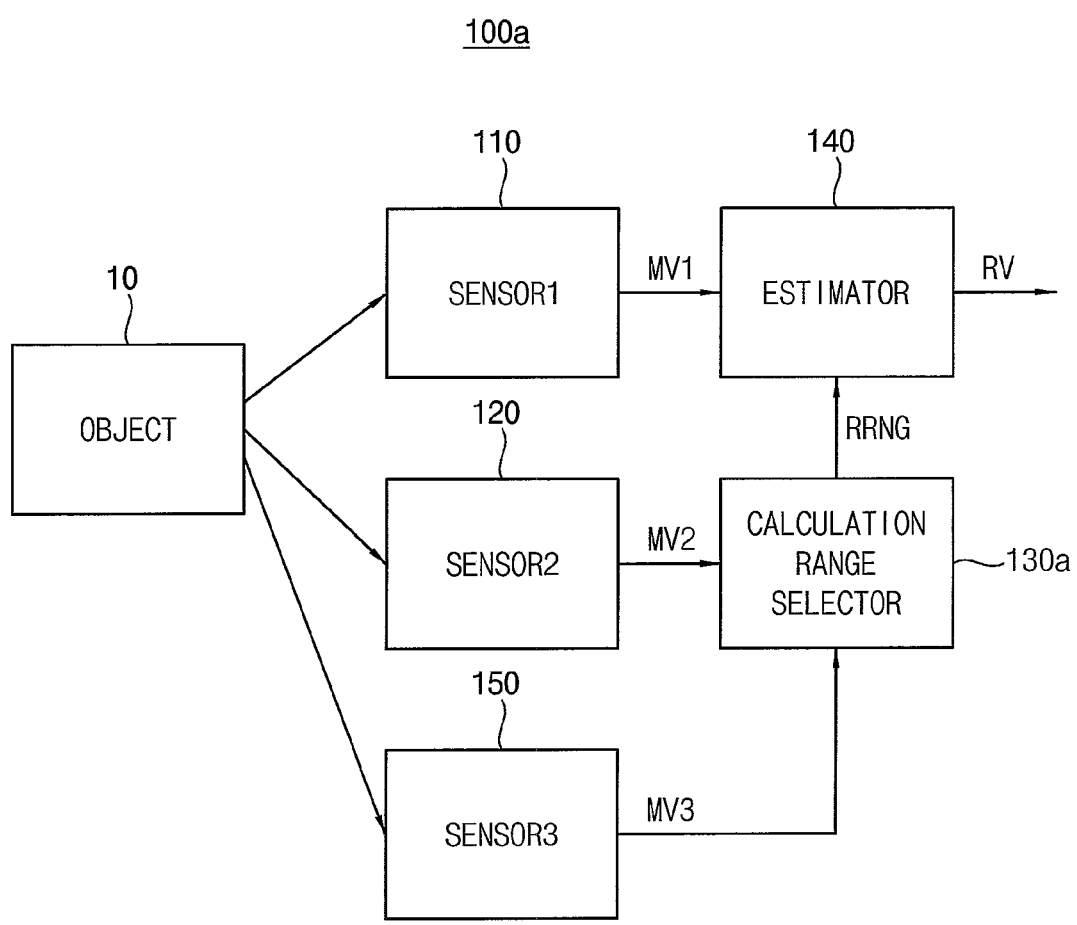
FIG. 10 is a block diagram illustrating an object detection device according to example embodiments.

FIG. 10 is a block diagram illustrating an object detection device according to example embodiments. The descriptions repeated with FIG. 1 will be omitted.

Referring to FIG. 10, an object detection device 100a includes a first sensor 110, a second sensor 120, a third sensor 150, a calculation range selector 130a and an estimator 140.

The object detection device 100a of FIG. 10 may be substantially the same as the object detection device 100 of FIG. 1, except that the object detection device 100a further includes the third sensor 150 and an operation of the calculation range selector 130*a* is partially changed.

The third sensor 150 may obtain a third measurement value MV3 for the object 10. The first sensor 110, the second sensor 120 and the third sensor 150 may be sensors of different types. For example, the first sensor 110, the second sensor 120 and the third sensor 150 may obtain the first measurement value MV1, the second measurement value MV2 and the third measurement value MV3, respectively, by sensing different physical characteristics from the object 10.

In some example embodiments, the first sensor 110 may be a RADAR sensor, one of the second sensor 120 and the third sensor 150 may be an image sensor. The other of the second sensor 120 and the third sensor 150 may be a LIDAR sensor.

The calculation range selector 130*a* sets the reference range RRNG based on the second measurement value MV2 and the third measurement value MV3. The reference range RRNG represents the range of execution of the first calculation for detecting the position of the object 10 using the first algorithm. Detailed operation of setting the reference range RRNG by the calculation range selector 130*a* will be described with reference to FIG. 12 and FIG. 13.

Figure 11:
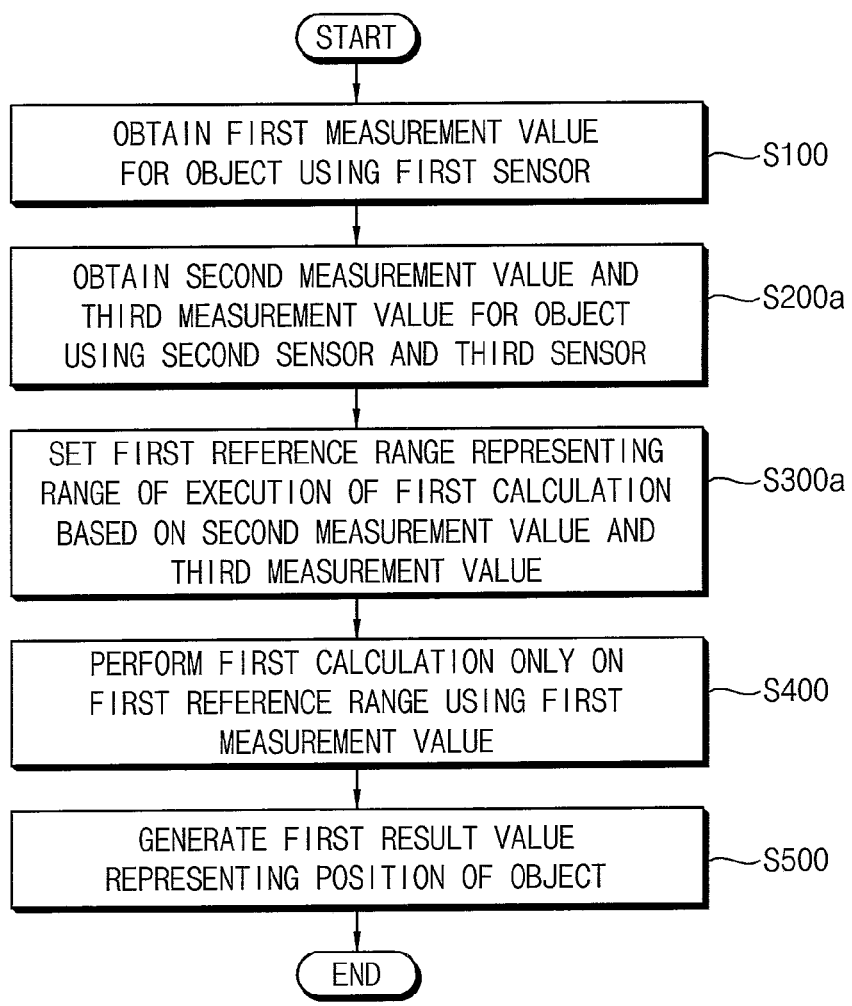
FIG. 11 is a flowchart illustrating an object detection method according to example embodiments.

FIG. 11 is a flowchart illustrating an object detection method according to example embodiments. The descriptions repeated with FIG. 5 will be omitted.

Referring to FIG. 10 and FIG. 11, in an object detection method according to example embodiments, steps S100, S400 and S500 in FIG. 11 may be substantially the same as steps S100, S400 and S500 in FIG. 5, respectively.

The second measurement value MV2 and the third measurement value MV3 for the object 10 are obtained using the second sensor 120 and the third sensor 150 (step S200*a*). Each of the second sensor 120 and the third sensor 150 may be a sensor of a different type from the first sensor 110. Each of the second sensor 120 and the third sensor 150 may sense the physical characteristic of the object 10 different from a characteristic of the object 10 measured by or otherwise reflected in the first measurement value MV1 obtained by the first sensor 110. A first reference range is set based on the second measurement value MV2 and the third measurement value MV3 (step S300*a*). The first reference range represents the range of execution of the first calculation based on the first algorithm. Step S300*a* may be performed by the calculation range selector 130*a*.

Figure 12:
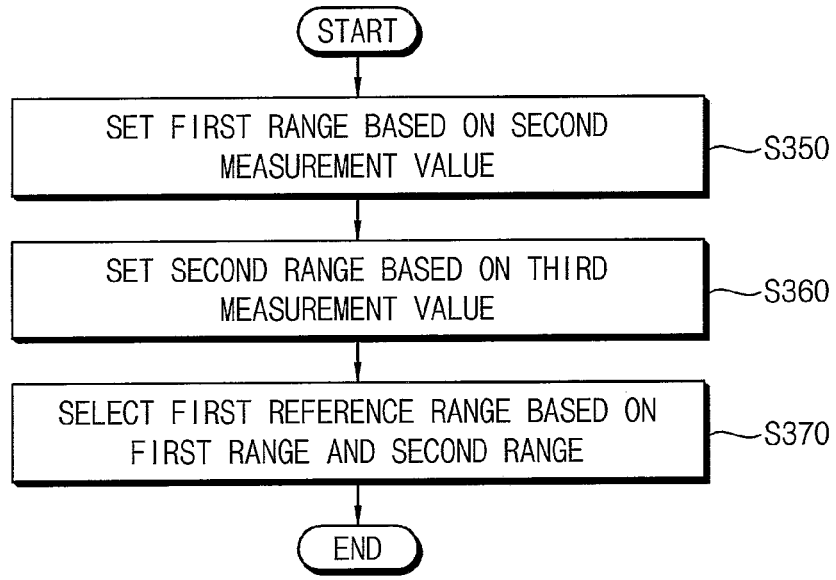
FIG. 12 and FIG. 13 are flowcharts illustrating an example of setting a first reference range in FIG. 11.
Figure 13:
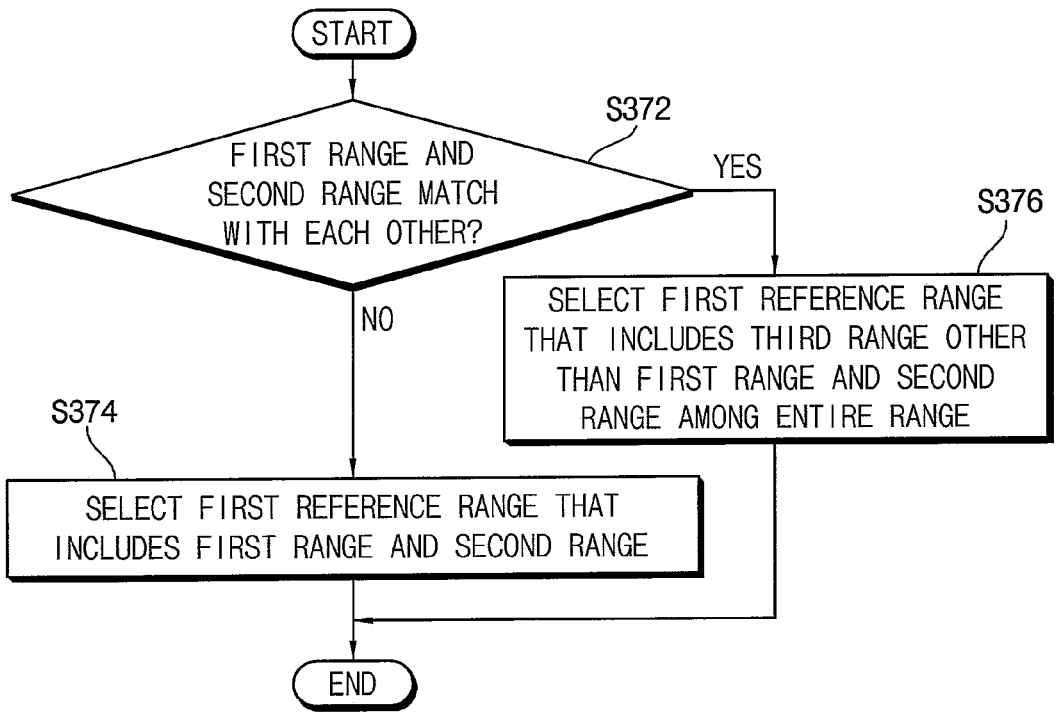

FIG. 12 and FIG. 13 are flowcharts illustrating an example of setting a first reference range in FIG. 11.

Referring to FIG. 10, FIG. 11, FIG. 12 and FIG. 13, when setting the first reference range (step S300*a*), a first range may be set based on the second measurement value MV2 obtained from the second sensor 120 (step S350), a second range may be set based on the third measurement value MV3 obtained from the third sensor 150 (step S360). The first reference range may be selected based on the first range and the second range (step S370).

When selecting the first reference range based on the first range and the second range (step S370), when the first range and the second range do not match with each other (step S370: YES), the first reference range that includes the first range and the second range may be selected (step S374).

For example, when a determination result of the second sensor 120 and a determination result of the third sensor are different from each other, the first reference range that is identical to a sum of the first range and the second range may be selected. Accordingly, the first calculation in step S400 of FIG. 11 may be performed such that it is finally determined which of the determination result of the second sensor 120 and the determination result of the third sensor is correct. For example, step S374 may be used when the image sensor which is the second sensor 120 is contaminated, and/or when a picture drawn on a floor or wall is misleadingly recognized as the object rather than the floor or wall itself.

When the first range and the second range match with each other (step S370: NO), the first reference range that includes a third range other than the first range and the second range among the entire range available for selection may be selected (step S376).

For example, when the determination result of the second sensor 120 and the determination result of the third sensor are the same as each other, the first reference range that is identical to the third range other than the first range and the second range may be selected. Accordingly, the first calculation in step S400 of FIG. 11 may be performed such that the determination result of the second sensor 120 and the determination result of the third sensor are trusted and the remaining ranges are checked.

Although operations and specific scenarios for selecting the first reference range are described with reference to FIG. 12 and FIG. 13, example embodiments are not limited thereto, and operations and specific scenarios for selecting the first reference range may vary according to example embodiments.

Figure 14:
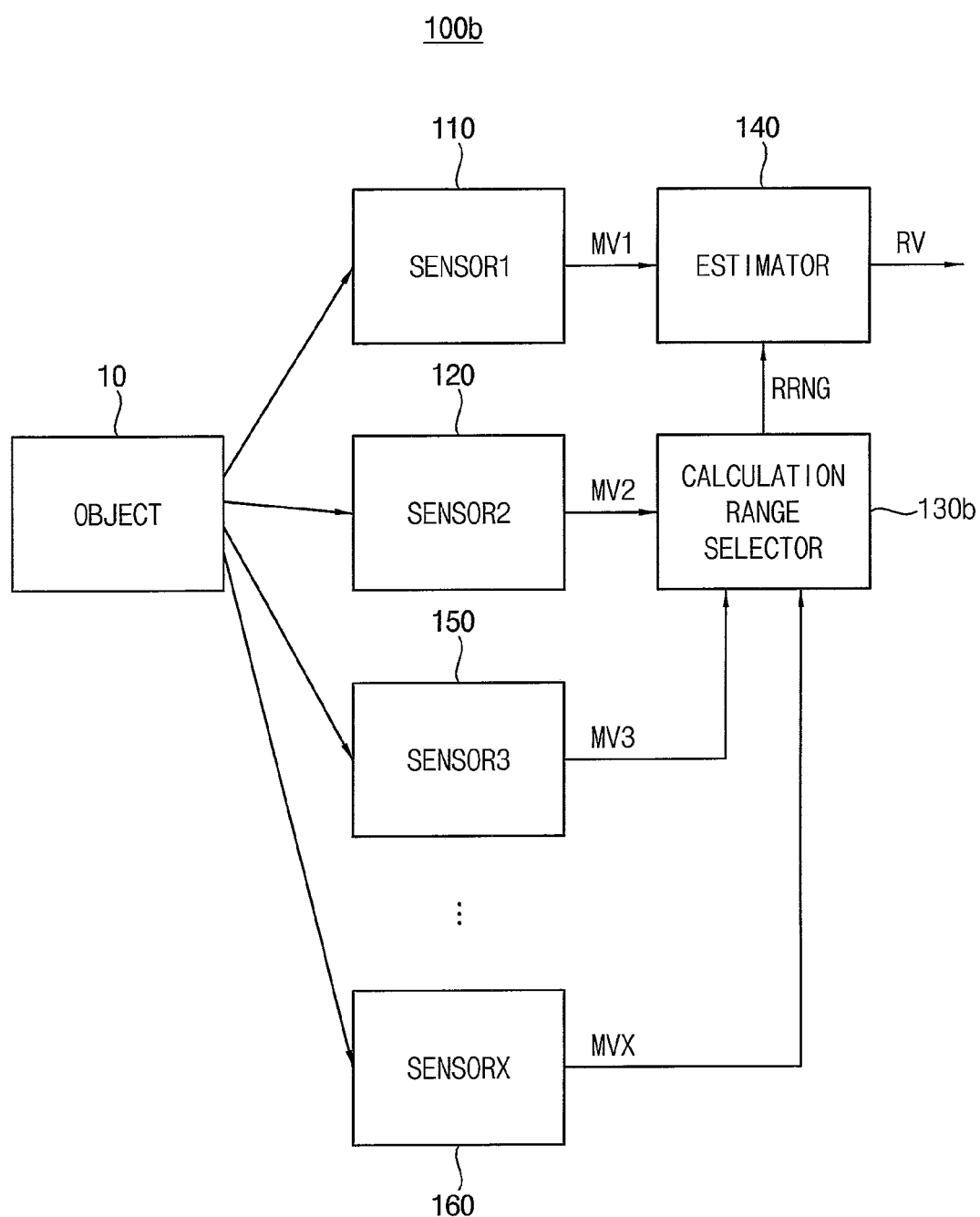
FIG. 14 is a block diagram illustrating an object detection device according to example embodiments.

FIG. 14 is a block diagram illustrating an object detection device according to example embodiments. The descriptions repeated with FIG. 1 and FIG. 10 will be omitted.

Referring to FIG. 14, an object detection device 100*b* includes a first sensor 110, a second sensor 120, a third sensor 150, an X-th sensor 160 where X is a natural number greater than or equal to four, a calculation range selector 130*b* and an estimator 140.

The object detection device 100*b* of FIG. 14 may be substantially the same as the object detection device 100*a* of FIG. 10, except that the object detection device 100*b* further includes the X-th sensor 160 and an operation of the calculation range selector 130*b* is partially changed.

The X-th sensor 160 may obtain an X-th measurement value MVX for the object 10. The first sensor 110, the second sensor 120, the third sensor 150 and the X-th sensor 160 may be sensors of different types. For example, the first sensor 110, the second sensor 120, the third sensor 150 and the X-th sensor 160 may obtain the first measurement value MV1, the second measurement value MV2, the third measurement value MV3 and the X-th measurement value MVX, respectively, by sensing different physical characteristics from the object 10.

The calculation range selector 130*b* sets the reference range RRNG based on the second measurement value MV2, the third measurement value MV3 and the X-th measurement value MVX. The reference range RRNG represents the range of execution of the first calculation for detecting the position of the object 10 using the first algorithm. An operation of setting the reference range RRNG by the calculation range selector 130*b* may be implemented similar to that described with reference to FIG. 6, FIG. 7, FIG. 12 and FIG. 13.

In some example embodiments, when the object detection devices 100*a* and 100*b* further include two or more sensors of different types other than the first sensor 110 as illustrated in FIG. 10 and FIG. 14, the object detection devices 100*a* and 100*b* may be implemented to further include an environmental sensor and a weight setting unit. The environmental sensor may include at least one of a temperature sensor, a humidity sensor, a pressure sensor, a motion sensor, a time sensor, a spatial sensor, an illuminance sensor, an acceleration sensor, a vibration sensor, a mechanical stress sensor, a shock sensor, or the like for sensing information associated with surrounding environment. The weight setting unit may assign or allocate different weights (or reliabilities) to measurement values obtained from the sensors other than the first sensor 110 based on the information associated with the surrounding environment sensed by the environment sensor. For example, in a foggy or misty environment, the weight setting unit may assign a relatively low weight to a measurement value of the image sensor and a relatively high weight to a measurement value of the LIDAR sensor. The calculation range selectors 130*a* and 130*b* may select the first reference range based on the measurement values and the weights.

Figure 15:
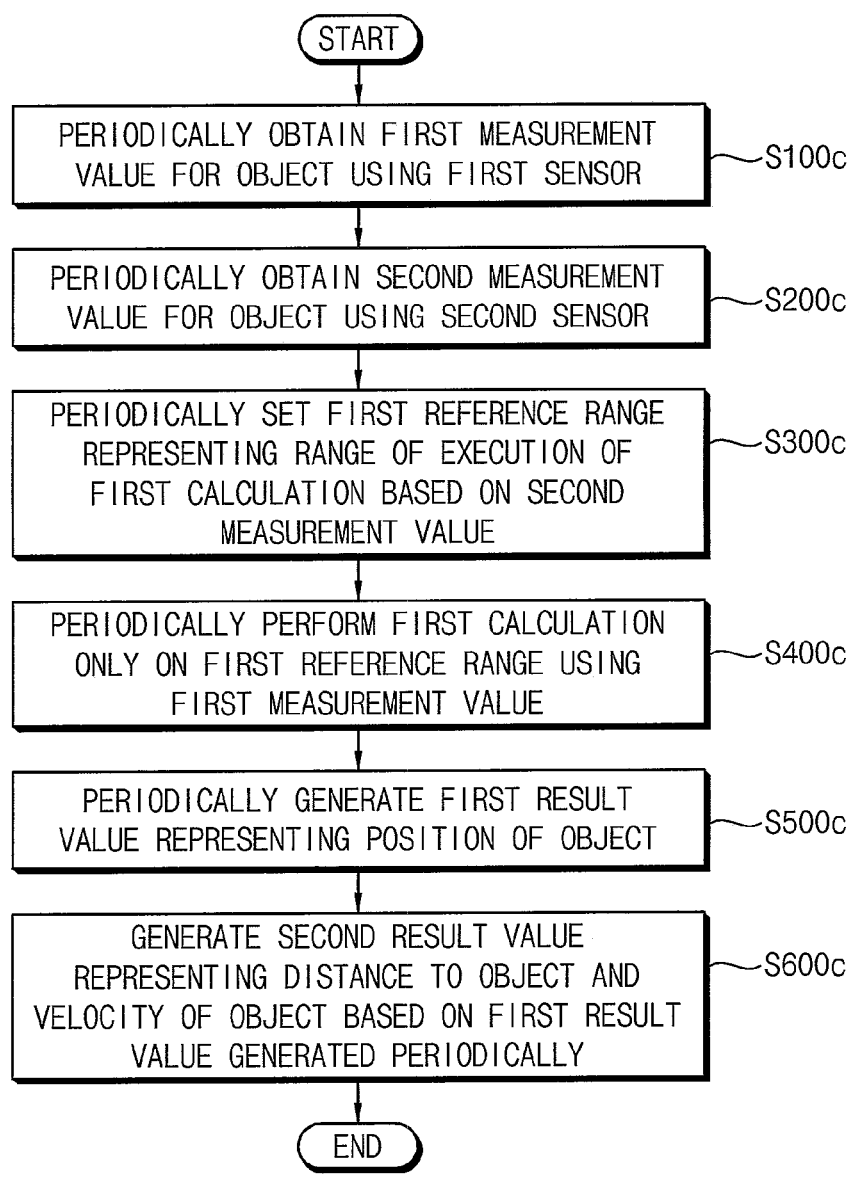
FIG. 15 is a flowchart illustrating an object detection method according to example embodiments.

FIG. 15 is a flowchart illustrating an object detection method according to example embodiments. The descriptions repeated with FIG. 5 will be omitted.

Referring to FIG. 1 and FIG. 15, in an object detection method according to example embodiments, the first measurement value MV1 for the object 10 is periodically obtained using the first sensor 110 (step S100*c*). The second measurement value MV2 for the object 10 is periodically obtained using the second sensor 120 (step S200*c*). The first reference range is periodically set based on the second measurement value MV2 (step S300*c*). The first calculation is periodically performed only on the first reference range using the first measurement value MV1 (step S400*c*). The first result value is periodically generated (step S500*c*). Steps S100*c*, S200*c*, S300*c*, S400*c* and S500*c* in FIG. 15 may be substantially the same as steps S100, S200, S300, S400 and S500 in FIG. 5, respectively, except that steps S100*c*, S200*c*, S300*c*, S400*c* and S500*c* are periodically performed.

A second result value is further generated based on the first result value generated periodically (step S600*c*). The second result value represents a distance to the object 10 and a velocity of the object 10. For example, when the first result value is the azimuth of the object 10, the amount of change in the azimuth may be estimated. Accordingly, the distance to the object 10 and/or the velocity of the object 10 may be calculated. Step S600*c* may be performed by the estimator 140.

In some example embodiments, as illustrated in FIG. 15, the periodic executions and the operation of generating the second result value may be additionally performed on the object detection method of FIG. 11.

Figure 16:
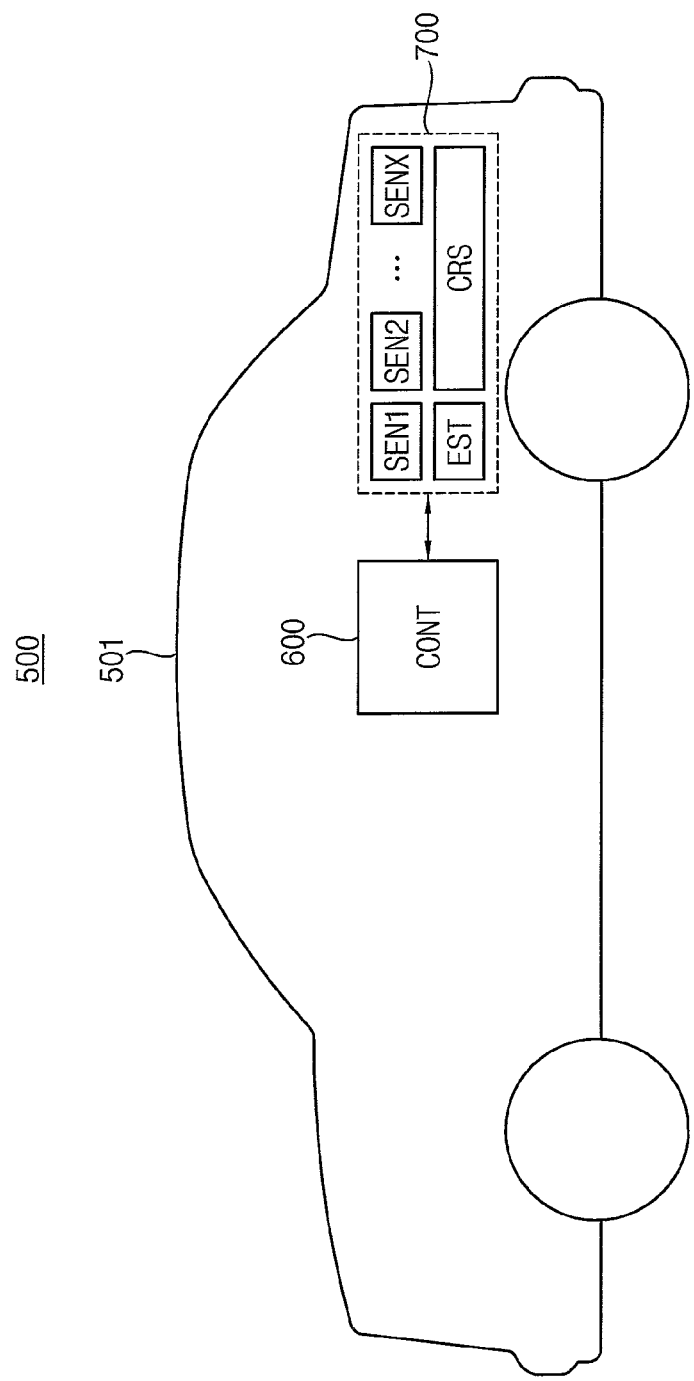
FIG. 16 is a block diagram illustrating a vehicle control system according to example embodiments.

FIG. 16 is a block diagram illustrating a vehicle control system according to example embodiments.

Referring to FIG. 16, a vehicle control system 500 includes a controller 600 and an object detection device 700 that are mounted, equipped or installed on a vehicle 501.

The object detection device 700 detects an object around the vehicle 501 and generates a first result value representing a position of the object. The object detection device 700 may be the object detection device according to example embodiments described with reference to FIG. 1 through FIG. 15. For example, the object detection device 700 may include a sensor SEN1, one or more sensors SEN2, . . . , SENX, a calculation range selector CRS and an estimator. Each of the one or sensors SEN2 . . . SENX may be a sensor of a different type from the sensor SEN1. The calculation range selector CRS may set a reference range based on measurement values of the sensors SEN2 . . . , SENX. An estimator EST may perform a first calculation based on a first algorithm (e.g., the MUSIC algorithm) only on the reference range using a measurement value of the sensor SEN1 and may generate the first result value.

The controller 600 controls the vehicle 501 based on the first result value. For example, the controller 600 may include any processing unit such as a central processing unit (CPU), an application processor (AP), or the like.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 17:
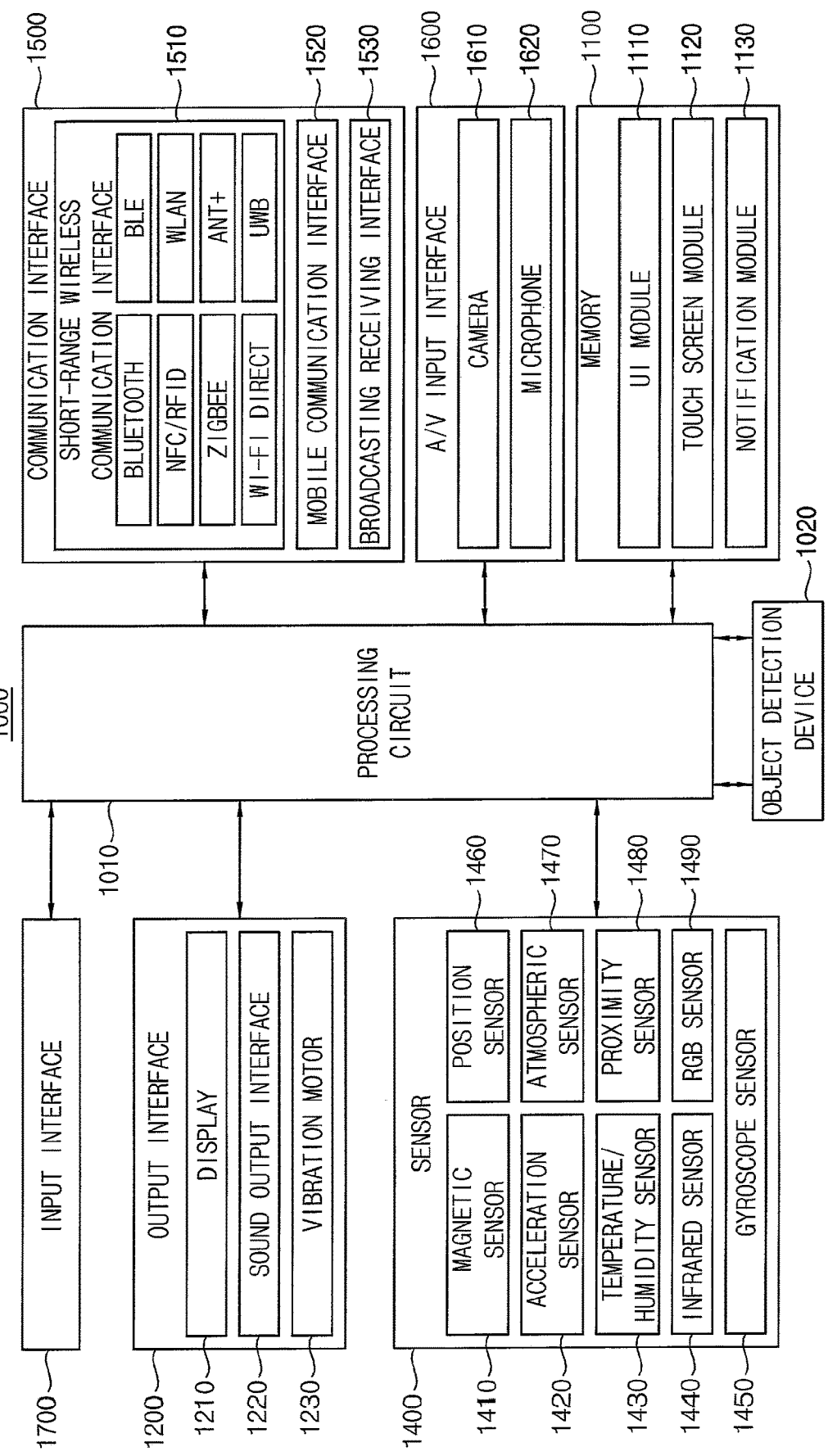
FIG. 17 is a block diagram illustrating an electronic device including a vehicle control system according to example embodiments.

FIG. 17 is a block diagram illustrating an electronic device including a vehicle control system according to example embodiments.

Referring to FIG. 17, an electronic device 1000 includes a processing circuit 1010 and an object detection device 1020. The electronic device 1000 may further include a memory 1100, an output interface 1200 (e.g., including output circuitry), a sensor 1400, a communication interface 1500 (e.g., including communication circuitry), an A/V input interface 1600 (audio/video input interface) (e.g., including A/V input circuitry), and an input interface 1700 (e.g., including input circuitry). As will be described with reference to FIG. 18, the electronic device 1000 may be an ADAS, an autonomous driving system, or the like, that is mounted, equipped or installed in a vehicle.

The processing circuit 1010 includes various processing circuitry and controls general operations of the electronic device 1000. The object detection device 1020 is controlled by the processing circuit 1010, and performs an object detection operation. The processing circuit 1010 and the object detection device 1020 may correspond to the controller 600 and the object detection device 700 in FIG. 16, respectively. At least some of the sensors included in the object detection device 700 of FIG. 16 may be included in the sensor 1400, the A/V input interface 1600, and the like.

The input interface 1700 may receive an input for controlling an operation of a module mounted in a vehicle.

The output interface 1200 may include various circuitry to output an audio signal, a video signal, and/or a vibration signal. The output interface 1200 and may include a display 1210, a sound output interface 1220 (e.g., including sound output circuitry), and a vibration motor 1230. For example, the output interface 1200 may output a notification message as an audio, a video, and/or vibration.

The display 1210 may display and output information processed in the electronic device 1000. For example, the display 1210 may display a notification message on a head up display (HUD) of a vehicle. The sound output interface 1220 may include various circuitry to output audio data received from the communication interface 1500 or stored in the memory 1100. Also, the sound output interface 1220 may output a sound signal (e.g., a call signal reception sound, a message reception sound, a notification sound) related to functions performed in the electronic device 1000.

The processing circuit 1010 may generally control the input interface 1700, the output interface 1200, the sensor 1400, the communication interface 1500, the A/V input interface 1600, or the like, by executing programs stored in the memory 1100. Also, the processing circuit 1010 may perform the functions of the electronic device 1000, by executing the programs stored in the memory 1100. The processing circuit 1010 may include at least one processor. The processing circuit 1010 may include a plurality of processors or an integrated one processor, based on functions and operations thereof.

The sensor 1400 may include various sensors and sensing circuitry to sense a state of the electronic device 1000, a state of a user, or a state around the electronic device 1000. The sensor 1400 may transmit sensed information to the processing circuit 1010.

The sensor 1400 may include various sensing circuitry. For example, and without limitation, the sensor 1400 may include at least one of a magnetic sensor 1410, an acceleration sensor 1420, a temperature/humidity sensor 1430, an infrared sensor 1440, a gyroscope sensor 1450, a position sensor (e.g., global positioning system (GPS)) 1460, an atmospheric sensor 1470, a proximity sensor 1480, and an RGB sensor 1490.

The communication interface 1500 may include various communication circuitry including at least one component configured to enable the electronic device 1000 to communicate with another electronic device (not illustrated) and a server (not illustrated). The other electronic device may be a computing device or a sensor, but is not limited thereto. For example, the communication interface 1500 may include a short-range wireless communication interface 1510, a mobile communication interface 1520, and a broadcasting receiving interface 1530.

The short-range wireless communication interface 1510 may include a Bluetooth communication interface, a Bluetooth low energy (BLE) communication interface, a near-field communication and/or radio frequency identification (NFC/RFID) interface, a WLAN (e.g., Wi-fi) communication interface, a Zigbee communication interface, an infrared data association (IrDA) communication interface (not illustrated), a Wi-fi direct (WFD) communication interface, a ultra wideband (UWB) communication interface, an Ant+ communication interface, or the like, but is not limited thereto.

The A/V input interface 1600 may include various A/V interface circuitry and is configured to input an audio signal or a video signal. The A/V input interface 1600 may include a camera 1610, a microphone 1620, or the like. The camera 1610 may obtain an image frame, such as a still image or a video, via an image sensor, in a videotelephony mode or a photographing mode. The image captured by the image sensor may be processed by the processing circuit 1010 or an additional image processor (not illustrated).

The microphone 1620 may receive an external sound signal and process the external sound signal as electrical sound data. For example, the microphone 1620 may receive the sound signal from an external device or the user. The microphone 1620 may use various noise-removal algorithms to remove noise generated in a process of receiving the external sound signal.

The memory 1100 may store programs for the processing and controlling operations of the processing circuit 1010. The memory 1100 may store data that is input to the electronic device 1000 or output from the electronic device 1000.

The memory 1100 may include at least one type of storage medium from among a flash memory type, a hard disk type, a multimedia card micro type. The programs stored in the memory 1100 may be divided into a plurality of modules based on their functions. For example, the programs may be divided into a UI module 1110 (user interface module), a touch screen module 1120, and a notification module 1130.

The UI module 1110 may provide a specialized UI, a graphic user interface (GUI), etc., which are synchronized to the electronic device 1000, for each application. The touch screen module 1120 may sense a touch gesture on a touch screen via the user, and transmit information related to the touch gesture to the processing circuit 1010. The touch screen module 1120 may be implemented as additional hardware including a controller.

The notification module 1130 may generate a signal to notify about occurrence of an event. The notification module 1130 may output the notification signal as a video signal via the display 1210, output the notification signal as an audio signal via the sound output interface 1220, or output the notification signal as a vibration signal via the vibration motor 1230.

Figure 18:
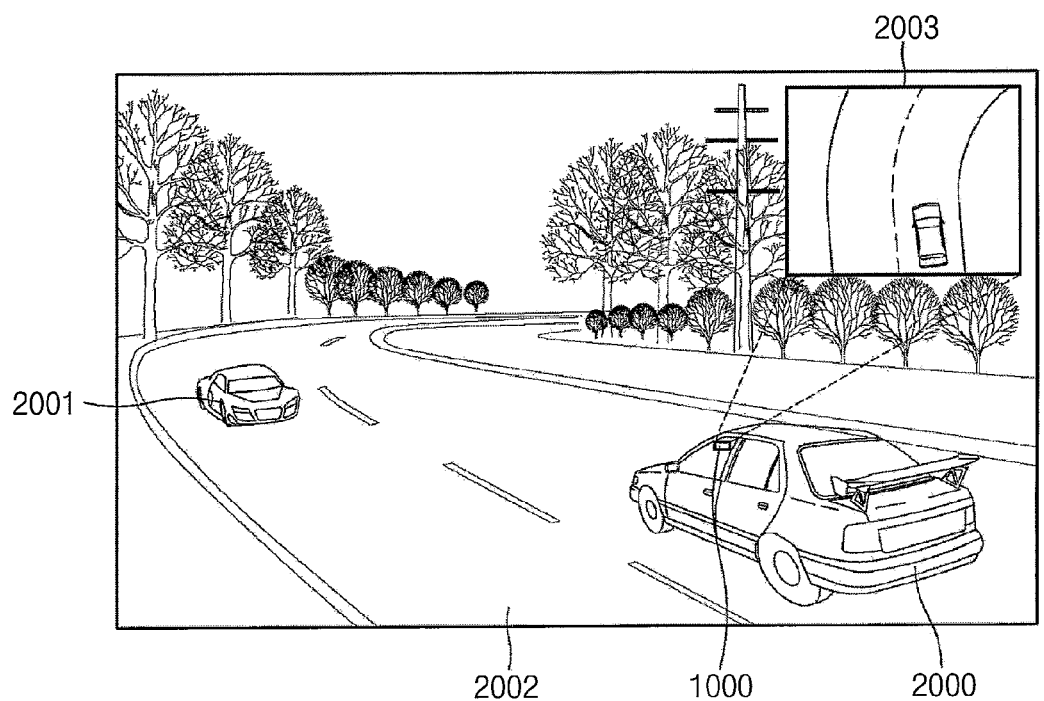
FIG. 18 is a diagram illustrating an example in which an electronic device according to example embodiments is mounted in a vehicle.

FIG. 18 is a diagram illustrating an example in which an electronic device according to example embodiments is mounted in a vehicle.

Referring to FIG. 18, an electronic device 1000 may be an ADAS, an autonomous driving system, or the like, that is included (e.g., mounted) in a vehicle 2000. The electronic device 1000 may include various instances of circuitry and components configured to receive a video sequence including a stereo image, reflected waves (e.g., reflected electromagnetic waves), or reflected lights from a camera mounted in the vehicle 2000 and determine occurrence of various events associated with the vehicle 2000. The various events may include object detection, object tracking and scene segmentation. The electronic device 1000 may generate an output signal that includes a notification message that may be presented to an occupant (e.g., user) of the vehicle 2000, via one or more user interfaces of the vehicle 2000, based on a determined occurrence of one or more events. The electronic device 1000 may generate an output signal that causes a vehicle control system of the vehicle 2000 to control one or more driving elements of the vehicle 2000 to control the driving (e.g., driving trajectory) of the vehicle 2000, based on a determined occurrence of one or more events.

While it is described that the electronic device 1000 receives the video sequence from the camera mounted in the vehicle 2000, example embodiments are not limited thereto. The electronic device 1000 may receive the video sequence from a camera to capture a surrounding environment of the vehicle 2000. The surrounding environment of the vehicle 2000 (also referred to herein as a driving environment associated with the vehicle 2000) may include, for example, a front side, lateral sides, and a rear side.

In some example embodiments, the electronic device 1000 may detect an event based on location of the event by tracking a bounding box designating the object. Accordingly, the electronic device 1000 may differently recognize levels of importance of a type of object based on locations thereof, thereby determining whether an event occurs based on the locations of the object.

In some example embodiments, the electronic device 1000 may detect at least one video sequence 2003 (or, a stereo image) including an object, from among a plurality of video sequences, and may obtain waves reflected from a RADAR sensor (e.g., reflected electromagnetic waves) or reflected lights (not illustrated). Reflected waves may be captured at one or more sensors at the vehicle 2000 and may be reflected from one or more objects located in the surrounding environment (e.g., driving environment). The electronic device 1000 may detect a road 2002 including a fixed pattern and another vehicle 2001 moving according to time, by analyzing the at least one video sequence 2003. In some example embodiments, the electronic device 1000 may determine occurrence of an event based on detection of the other vehicle 2001, by analyzing a location of the other vehicle 2001 by analyzing a coordinate of the other vehicle 2001 in the at least one video sequence 2003. The electronic device 1000 may further generate an output signal based on the determination that, when processed by a control system of the vehicle 2000, causes a particular notification message to be presented to an occupant of the vehicle 2000 via a user interface of the vehicle 2000. Also or alternatively, the output signal generated based on the determination may cause causes driving of the vehicle 2000 to be controlled to cause the vehicle 2000 to be driven along a particular driving path (e.g., on a driving trajectory) through the surrounding environment. For example, the output signal generated based on the determination may cause driving of the vehicle 2000 to be autonomously controlled as an autonomous vehicle by an autonomous driving system.

In some example embodiments, the vehicle 2000 may include any means of transportation. For example, and without limitation, the vehicle 2000 may be an automobile, a bus, a truck, a train, a bicycle, a motorcycle, a scooter or the like. Any instantiation of the vehicle 2000 may provide a communication function, a data processing function, and/ or a transportation function consistent with the descriptions herein.

The above-described various example embodiments are implemented by hardware components, software components or combinations of the hardware components and the software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components.

The inventive concept may be applied to various devices and/or systems including the object detection devices and the vehicle control systems. For example, the inventive concept may be applied to systems such as an advanced driver assistance system (ADAS), an autonomous driving system, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An object detection device, comprising:
   a first sensor configured to output a radio frequency (RF) signal, to receive a reflected RF signal reflected from an object, and to obtain a first measurement value for the object based on a received reflected RF signal;
   a second sensor configured to obtain a second measurement value for the object by sensing a physical characteristic from the object, the physical characteristic sensed by the second sensor being different from a characteristic of the object measured as the first measurement value obtained by the first sensor;
   a calculation range selector configured to set a first reference range based on the second measurement value obtained by the second sensor, the first reference range representing a range of execution of a first calculation for detecting a position of the object using a first algorithm; and
   an estimator configured to perform the first calculation only on the first reference range set by the calculation range selector based on the second measurement value obtained by the second sensor, using the first measurement value obtained by the first sensor, and to generate a first result value as a result of performing the first calculation, the first result value representing the position of the object.

2. The object detection device of claim 1, wherein the calculation range selector is configured to:
   set a first range based on the second measurement value obtained from the second sensor, and
   select the first reference range that matches the first range.

3. The object detection device of claim 2, wherein, when a reliability of the first range is higher than a reference value or when an additional check operation is required for the first range, the first reference range that matches the first range is selected.

4. The object detection device of claim 1, wherein the calculation range selector is configured to:
   set a first range based on the second measurement value obtained from the second sensor, and
   select the first reference range that matches a second range other than the first range among an entire range available for selection for the first reference range.

5. The object detection device of claim 4, wherein, when a reliability of the first range is lower than a reference value or when a check operation is required for the second range other than the first range, the first reference range that matches the second range is selected.

6. The object detection device of claim 1, wherein the first sensor is a radio detection and ranging (RADAR) sensor.

7. The object detection device of claim 6, wherein the first sensor includes:
   a transmission antenna configured to output the RF signal;
   a plurality of reception antennas configured to receive the reflected RF signal reflected from the object; and
   a signal processor configured to divide the received RF signal obtained from each of the plurality of reception antennas into an in-phase component and a quadrature-phase component, to calculate a phase of the received RF signal based on the in-phase component and the quadrature-phase component, and to generate a phase vector corresponding to the first measurement value based on a calculated phase.

8. The object detection device of claim 7, wherein:
   the phase vector includes m components, where m is a natural number greater than or equal to two, and
   among the m components, a k-th component represents a phase difference between an RF signal received by a first reception antenna and an RF signal received by a k-th reception antenna among the plurality of reception antennas, where k is a natural number greater than or equal to one and less than or equal to m.

9. The object detection device of claim 1, wherein:
   the second sensor is an image sensor that obtains image information for the object based on reflected light reflected from the object, and
   the image information obtained by the second sensor corresponds to the second measurement value.

10. The object detection device of claim 1, wherein the first algorithm is a multiple signal classification (MUSIC) algorithm.

11. The object detection device of claim 10, wherein the estimator is configured to:
   select steering vectors corresponding to the first reference range from an array manifold (AM) vector including a plurality of steering vectors that are pre-measured,
   calculate covariance matrices based on selected steering vectors and a phase vector corresponding to the first measurement value,
   obtain a MUSIC spectrum value by normalizing the covariance matrices, by calculating determinants of normalized covariance matrices, and by reciprocalizing the determinants,
   extract a peak value from the MUSIC spectrum value, and
   estimate an azimuth of the object corresponding to the position of the object based on the peak value.

12. The object detection device of claim 1, further comprising:
   a third sensor configured to obtain a third measurement value for the object by sensing a physical characteristic from the object, the physical characteristic sensed by the third sensor being different from physical characteristics sensed by the first sensor and the second sensor, and
   wherein the calculation range selector is configured to set the first reference range based on the second measurement value and the third measurement value.

13. The object detection device of claim 12, wherein the calculation range selector is configured to:
   set a first range based on the second measurement value obtained from the second sensor,
   set a second range based on the third measurement value obtained from the third sensor, and
   select the first reference range based on the first range and the second range.

14. The object detection device of claim 13, wherein, when the first range and the second range do not match with each other, the first reference range that includes the first range and the second range is selected.

15. The object detection device of claim 13, wherein, when the first range and the second range match with each other, the first reference range that includes a third range other than the first range and the second range among an entire range available for selection is selected.

16. The object detection device of claim 12, wherein the third sensor is a light detection and ranging (LIDAR) sensor that outputs a laser pulse, receives a reflected laser pulse reflected from the object, and obtains the third measurement value based on a received reflected laser pulse.

17. The object detection device of claim 1, wherein:
   the first sensor and the second sensor are configured to periodically obtain the first measurement value and the second measurement value,
   the calculation range selector is configured to periodically set the first reference range, and
   the estimator is configured to periodically perform the first calculation and to periodically generate the first result value.

18. The object detection device of claim 17, wherein:
   the estimator is configured to further generate a second result value based on the first result value generated periodically, and
   the second result value represents a distance to the object and a velocity of the object.

19. A vehicle control system, comprising:
   an object detection device configured to detect an object around a vehicle and to generate a first result value representing a position of the object; and
   a controller configured to control the vehicle based on the first result value,
   wherein the object detection device includes:
      a first sensor configured to output a radio frequency (RF) signal, to receive a reflected RF signal reflected from the object, and to obtain a first measurement value for the object based on a received reflected RF signal;
      a second sensor configured to obtain a second measurement value for the object by sensing a physical characteristic from the object, the physical characteristic sensed by the second sensor being different from a characteristic of the object measured as the first measurement value obtained by the first sensor;
      a calculation range selector configured to set a first reference range based on the second measurement value obtained by the second sensor, the first reference range representing a range of execution of a first calculation for detecting the position of the object using a first algorithm; and an estimator configured to perform the first calculation only on the first reference range set by the calculation range selector based on the second measurement value obtained by the second sensor, using the first measurement value obtained by the first sensor, and to generate the first result value as a result of performing the first calculation.

20. An object detection device, comprising:

a first sensor configured to output a radio frequency (RF) signal, to receive a reflected RF signal reflected from an object, to divide a received reflected RF signal into an in-phase component and a quadrature-phase component, to calculate a phase of the received RF signal based on the in-phase component and the quadrature-phase component, and to generate a phase vector based on a calculated phase;

a second sensor configured to obtain image information for the object based on reflected light reflected from the object;

a third sensor configured to output a laser pulse, to receive a reflected laser pulse reflected from the object, and to obtain measurement information for the object based on a received reflected laser pulse;

a calculation range selector configured to set a first reference range based on at least one of the image information obtained by the second sensor and the measurement information obtained by the third sensor, the first reference range being a portion of an entire range of execution available for selection of a multiple signal classification (MUSIC) algorithm; and an estimator configured to perform a calculation based on the MUSIC algorithm only on the first reference range using the phase vector, and to estimate an azimuth of the object representing a position of the object, and wherein the estimator is configured to select steering vectors corresponding to the first reference range from an array manifold (AM) vector including a plurality of steering vectors that are pre-measured, to calculate covariance matrices based on selected steering vectors and the phase vector, to obtain a MUSIC spectrum value by normalizing the covariance matrices, by calculating determinants of normalized covariance matrices, and by reciprocalizing the determinants, to extract a peak value from the MUSIC spectrum value, and to estimate the azimuth of the object based on the peak value.

* * * * *